(12) United States Patent
Schrick

(10) Patent No.: US 11,492,141 B2
(45) Date of Patent: Nov. 8, 2022

(54) SYSTEMS AND METHODS FOR CAPTURING AND RECOVERING UNMANNED AIRCRAFT

(71) Applicant: INSITU, INC., Bingen, WA (US)

(72) Inventor: Bradley Louis Schrick, Hood River, OR (US)

(73) Assignee: INSITU, INC., Bingen, WA (US)

( * ) Notice: Subject to any disclaimer, the term of this patent is extended or adjusted under 35 U.S.C. 154(b) by 423 days.

(21) Appl. No.: 16/614,632

(22) PCT Filed: May 25, 2018

(86) PCT No.: PCT/US2018/034733
§ 371 (c)(1),
(2) Date: Nov. 18, 2019

(87) PCT Pub. No.: WO2018/222551
PCT Pub. Date: Dec. 6, 2018

(65) Prior Publication Data
US 2020/0148388 A1 May 14, 2020

Related U.S. Application Data

(60) Provisional application No. 62/513,437, filed on May 31, 2017.

(51) Int. Cl.
*B64F 1/02* (2006.01)
*B64C 39/02* (2006.01)
*F16B 7/10* (2006.01)

(52) U.S. Cl.
CPC .......... *B64F 1/0297* (2020.01); *B64C 39/024* (2013.01); *B64F 1/029* (2020.01);
(Continued)

(58) Field of Classification Search
CPC ...... B64F 1/0297; B64F 1/029; B64C 39/024; B64C 2201/027; B64C 2201/182; F16B 7/105
See application file for complete search history.

(56) References Cited

U.S. PATENT DOCUMENTS 7,175,135 B2 * 2/2007 Dennis .................... B64C 25/68
244/110 F
7,510,145 B2 5/2009 Snediker
(Continued)

OTHER PUBLICATIONS

International Searching Authority, "International Search Report," mailed in connection with International Patent Application No. PCT/US2018/034733, dated Aug. 23, 2018, 2 pages.
(Continued)

*Primary Examiner* — Justin M Benedik
(74) *Attorney, Agent, or Firm* — Hanley, Flight & Zimmerman

(57) ABSTRACT

Systems and methods for capturing unmanned aircraft and controlling post-recovery motion of the aircraft are disclosed herein. An aircraft system in accordance with one embodiment of the technology, for example, includes a base assembly and an aircraft capture member attached to and extending from the base assembly. The aircraft capture member has a distal region positioned to intercept an unmanned aircraft in flight. The aircraft capture member comprises an elongated telescoping rod including a plurality of discrete segments having a telescoping arrangement relative to each other. The aircraft capture member is configured to elongate or pay out from a first initial length to a second extended length greater than the first length after an unmanned aircraft intercepts and engages the distal region of the aircraft capture member.

21 Claims, 15 Drawing Sheets

(52) U.S. Cl.
 CPC ........ *F16B 7/105* (2013.01); *B64C 2201/027* (2013.01); *B64C 2201/182* (2013.01)

(56) References Cited

U.S. PATENT DOCUMENTS

| | | | | |
|---|---|---|---|---|
| 8,172,177 | B2* | 5/2012 | Lovell | B64C 39/024 244/110 F |
| 2009/0236470 | A1* | 9/2009 | Goossen | B64C 39/024 244/115 |
| 2009/0242693 | A1* | 10/2009 | Urnes, Sr. | B64F 1/06 244/63 |
| 2009/0314883 | A1* | 12/2009 | Ariton | F41A 9/13 244/63 |
| 2012/0223182 | A1* | 9/2012 | Gilchrist, III | B64F 1/0297 244/110 F |
| 2015/0129716 | A1* | 5/2015 | Yoffe | B64F 1/0297 244/110 C |
| 2016/0251088 | A1* | 9/2016 | Melish | B64F 1/0295 244/110 C |

OTHER PUBLICATIONS

International Searching Authority, "Written Opinion," mailed in connection with International Patent Application No. PCT/US2018/034733, dated Aug. 23, 2018, 8 pages.

\* cited by examiner

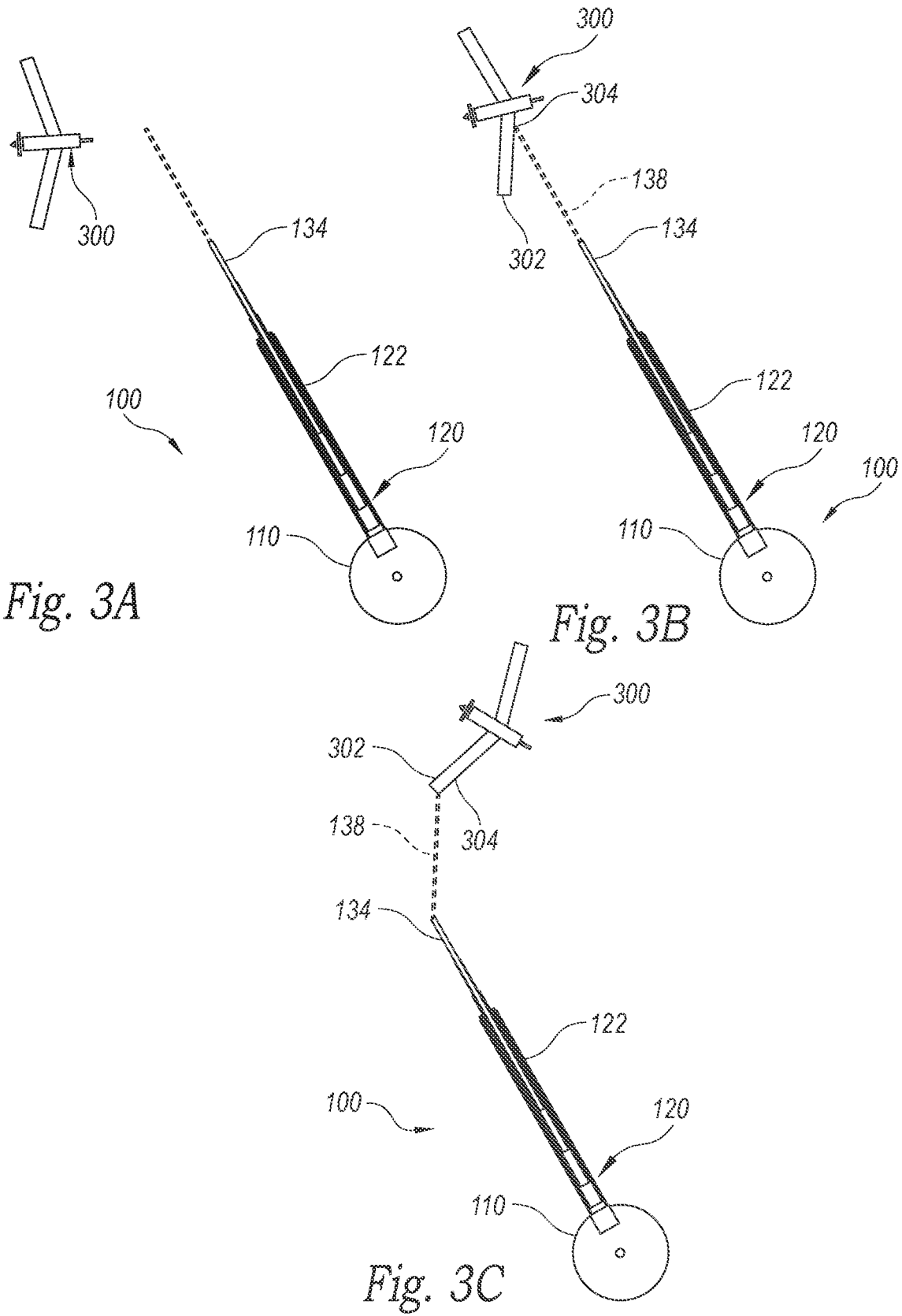

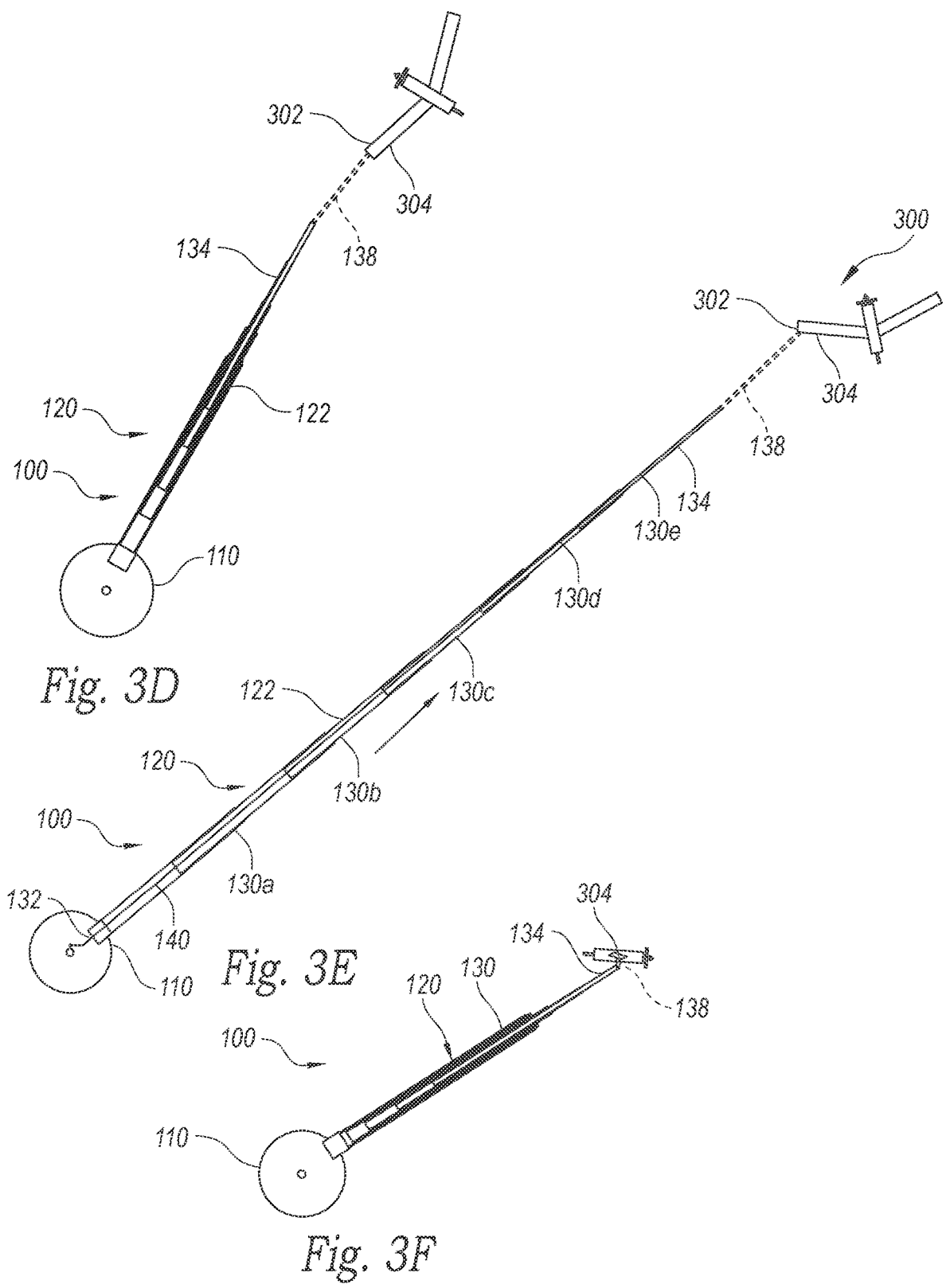

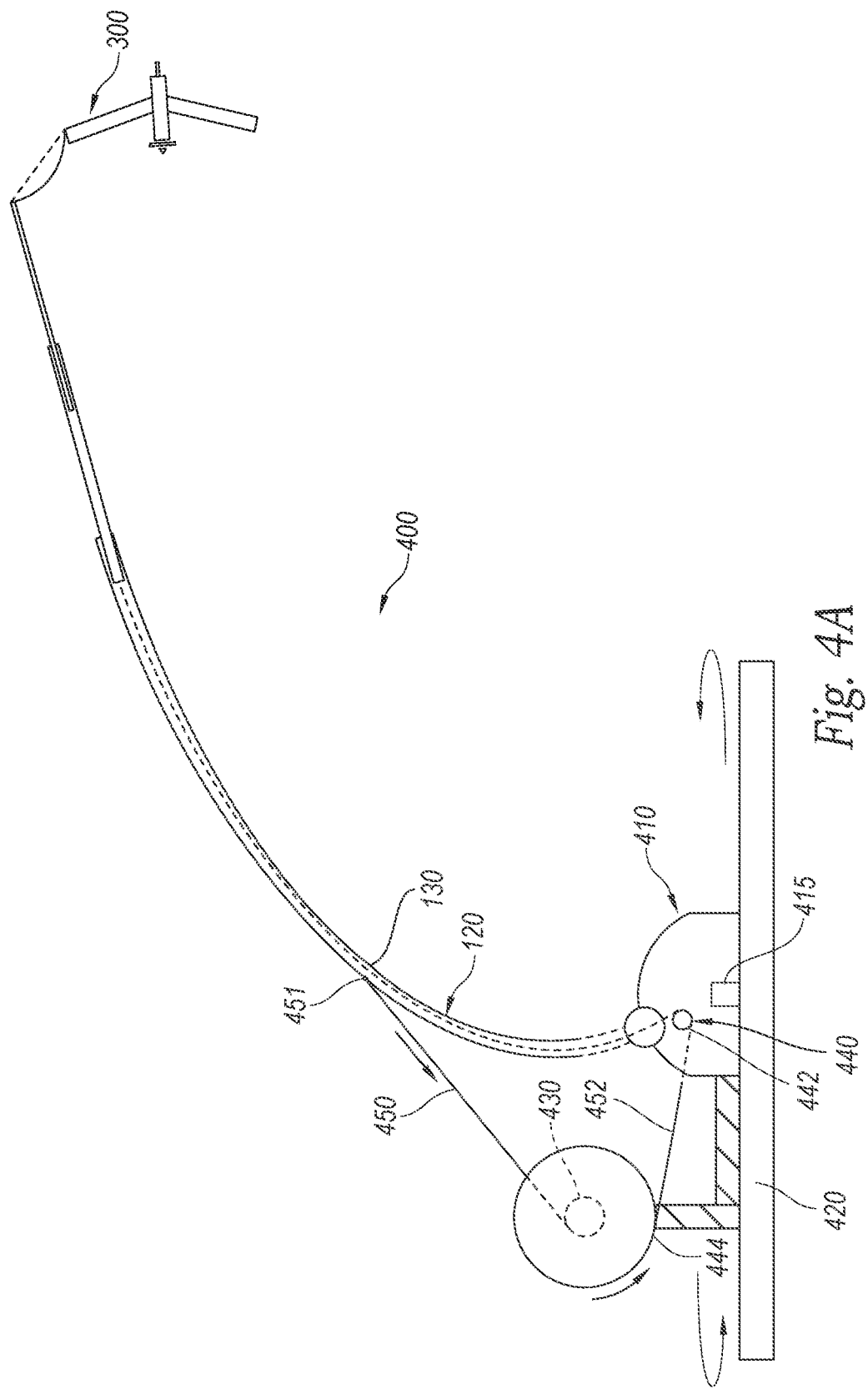

SYSTEMS AND METHODS FOR CAPTURING AND RECOVERING UNMANNED AIRCRAFT

CROSS-REFERENCE TO RELATED APPLICATION

The present application claims the benefit of U.S. Provisional Patent Application No. 62/513,437, filed May 31, 2017, which is incorporated herein by reference in its entirety.

TECHNICAL FIELD

The present disclosure relates generally to systems and methods for capturing and securely recovering unmanned aircraft.

BACKGROUND

Unmanned aircraft or aerial vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than larger, manned air vehicles and can accordingly be prone to damage, particularly when manually handled during recovery and launch operations in hostile environments, such as a heaving ship deck. Yet another drawback with some existing unmanned aircraft systems is that they may not be suitable for recovering aircraft in tight quarters, without causing damage to either the aircraft or the platform from which the aircraft is launched and/or recovered.

BRIEF DESCRIPTION OF THE DRAWINGS

FIGS. 3A-3G are partially schematic views indicating a sequence of events when operating a system for capturing an unmanned aircraft in flight and controlling post-recovery motion of the aircraft in accordance with an embodiment of the technology.

FIGS. 4A and 4B are partially schematic illustrations of an aircraft recovery system configured to capture an unmanned aircraft in flight and control post-recovery motion of the aircraft in accordance with another embodiment of the present technology.

DETAILED DESCRIPTION

Figure 1:
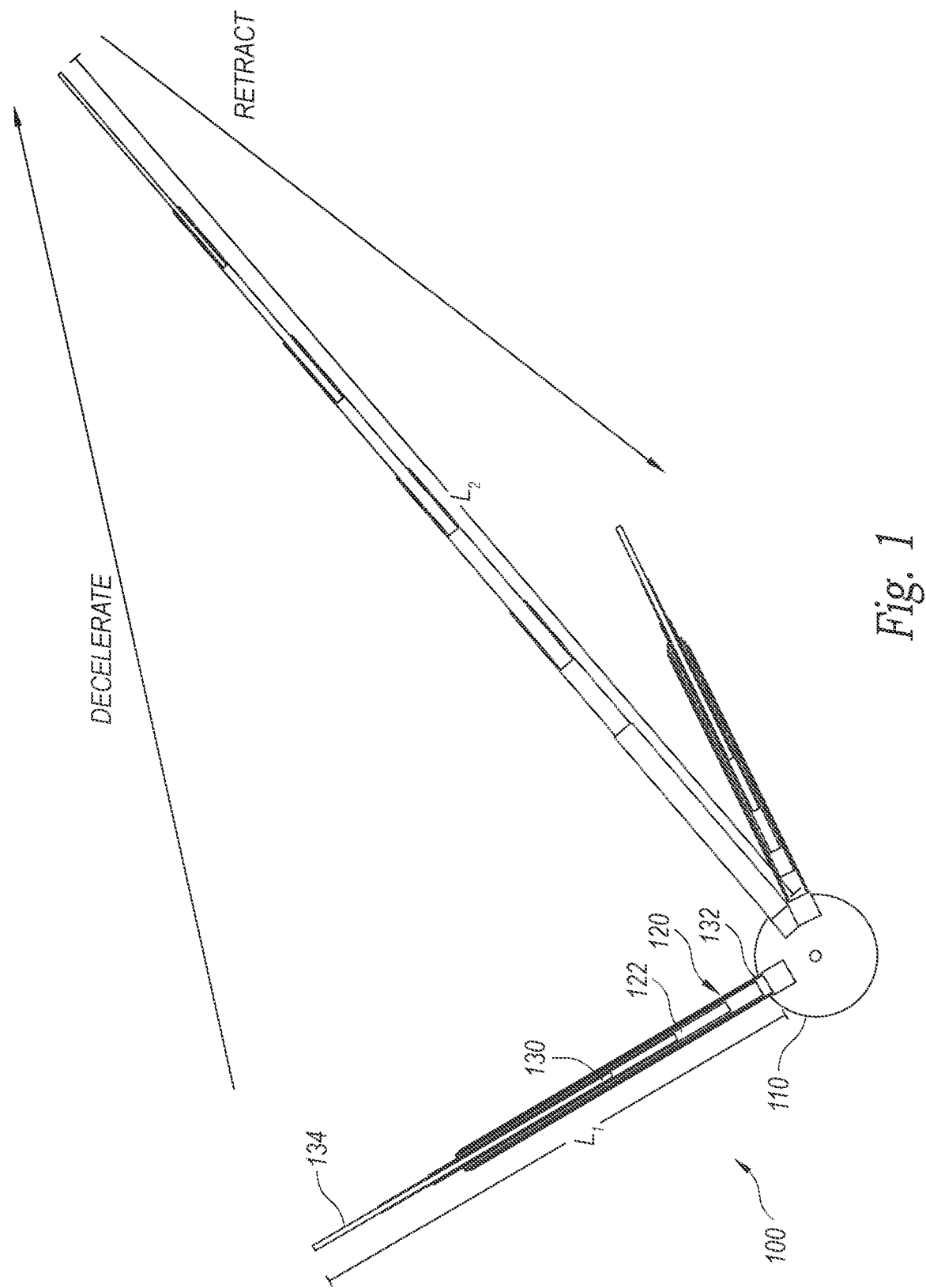
FIG. 1 is a partially schematic overhead view of an aircraft recovery system configured to capture and recover an unmanned aircraft in flight and control post-recovery motion of the aircraft in accordance with an embodiment of the present technology.

The present disclosure is directed generally to systems and methods for capturing and securely recovering unmanned aircraft without the need for a runway. In several of the embodiments described below, for example, an aircraft recovery system may include a telescoping or articulating rod or pole positioned to intercept an unmanned aircraft in flight. The aircraft's flight control and navigational systems can be configured to precisely guide the aircraft along a desired flight path to intercept the telescoping rod in flight, after which an engagement feature carried by wingtips of the aircraft securely captures or engages the telescoping rod or a capture element carried by the telescoping rod. The momentum of the captured aircraft can pivotably and, in some instances, rotatably move the telescoping rod relative to a base assembly. The aircraft's momentum also extends, stretches, or pays out the telescoping rod from an initially compact arrangement to an elongated arrangement. Such elongation is expected to absorb a significant amount of the impact and momentum forces from the aircraft and enable the system to quickly and efficiently stop and control the aircraft during recovery operations, while also reducing/minimizing stresses and loads on the aircraft during such operations to avoid potential damage to the aircraft and its payload. The altitude of the captured aircraft may also be increased after interception by the telescoping rod, thereby adding to the natural energy dissipation and energy capture characteristics of the system. In some embodiments, the aircraft recovery system may also optionally include other energy absorption or energy dissipation features, such as anchor/tension line(s), pneumatic components, friction resistance features, or other similar features configured to absorb and transfer momentum forces of the aircraft during operations and assist the system in bringing the aircraft to a stop in a controlled fashion without damaging the aircraft or the system itself.

In some embodiments, a method for capturing and recovering an unmanned aircraft in flight can include flying an unmanned aircraft to intercept a distal region of an elongated telescoping rod attached to and extending from a base assembly. The base assembly is in contact or otherwise engaged with a local support surface, such as the ground or a vehicle. The telescoping rod includes a plurality of discrete segments having a telescoping arrangement relative to each other. The method can further include releasably capturing the aircraft with the telescoping rod. The telescoping rod is configured to pay out or extend from a first length to a second length greater than the first length in response to momentum from the aircraft.

Specific details of several embodiments of the present technology are described herein with reference to FIGS. 1-11B. However, the present technology may be practiced without some of these specific details. In some instances, well-known structures and techniques have not been shown in detail so as not to obscure the present technology. The terminology used in the description presented below is intended to be interpreted in its broadest reasonable manner, even though it is being used in conjunction with a detailed description of certain specific embodiments of the disclosure. As used herein, for example, the terms "unmanned aircraft" or "aircraft" can include drones, unmanned aerial vehicles (UAVs), unmanned aircraft systems (UAS), robotic aircraft, and the like. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

A. Systems and Methods for Capturing and Securely Recovering Unmanned Aircraft

FIG. 1 is a partially schematic overhead view of an aircraft system 100 ("system 100") configured to capture an unmanned aircraft (not shown) in flight and control post-recovery motion of the aircraft in accordance with an embodiment of the present technology. The system 100 includes, for example, a base assembly 110 (shown schematically) and an elongated aircraft capture member 120 attached to and extending from the base assembly 110. In the illustrated embodiment, the aircraft capture member 120 is a flexible elongated rod 122 including a plurality of discrete segments or sections 130 having a telescoping or articulating arrangement relative to each other. The aircraft capture member 120 has a first end portion or proximal portion 132 coupled to the base assembly 110 and a second free end portion or distal portion 134 positioned to intercept an aircraft in flight. The aircraft capture member 120 is configured to pivotably move (before, during, and after intercepting the aircraft) and elongate, stretch, or pay out (as shown in broken lines) relative to the base assembly 110 after intercepting the aircraft and during capture and recovery operations.

In the illustrated embodiment, for example, the aircraft capture member 120 is extended from the base assembly 110 to position the second or distal end portion 134 in the flight path of an approaching aircraft. The aircraft capture member 120, for example, may be positioned at a desired angle relative to the local support surface (e.g., 45 degrees), and extend or be rotated toward the approaching aircraft in the horizontal plane around an imaginary vertical axis at a desired orientation angle (e.g., 30 degrees). This arrangement is expected to position a majority of the aircraft capture member 120 out of the flight path of the aircraft. In this way, if the aircraft is on a non-optimal flight path or a flight path that does not provide optimal intersection with the desired region of the capture member, the aircraft can circle around again for capture without inadvertently contacting the capture member or other components of the system 100.

When an aircraft (not shown) impacts the system 100 with the aircraft capture member 120 in a compressed intercept arrangement or state, the aircraft capture member 120 engages and releasably captures the aircraft and the aircraft capture member 120 is configured to absorb the initial aircraft capture forces. The aircraft capture member 120 is then configured to further absorb and dissipate the aircraft's capture/recovery forces and decelerate the aircraft as the aircraft capture member 120 pivotably moves about the base assembly 110 and extends, stretches, or pays out between the compressed intercept arrangement having a first or initial length $L_1$ and an elongated recovery arrangement or state (shown in broken lines). As shown, for example, when in the elongated recovery arrangement, the telescoping rod 122 is fully extended and has a second length $L_2$ greater than the first length.

Once captured, the aircraft can be suspended from a distal region of the aircraft capture member 120 by one of its wings or another suitable component of the aircraft (or by a capture member carried by the aircraft and/or the system 100), and the aircraft capture member 120 can be automatically or manually retracted/transformed back to a compressed arrangement or state (also shown in broken lines) and rotated as necessary to facilitate convenient and easy removal of the aircraft from the system 100 for refueling, refurbishment, additional operations, and/or storage. Further details regarding the system 100 and use of the system 100 to intercept, recover, and control post-recovery motion of aircraft are described below with reference to FIGS. 2A-9B.

Figure 2B:
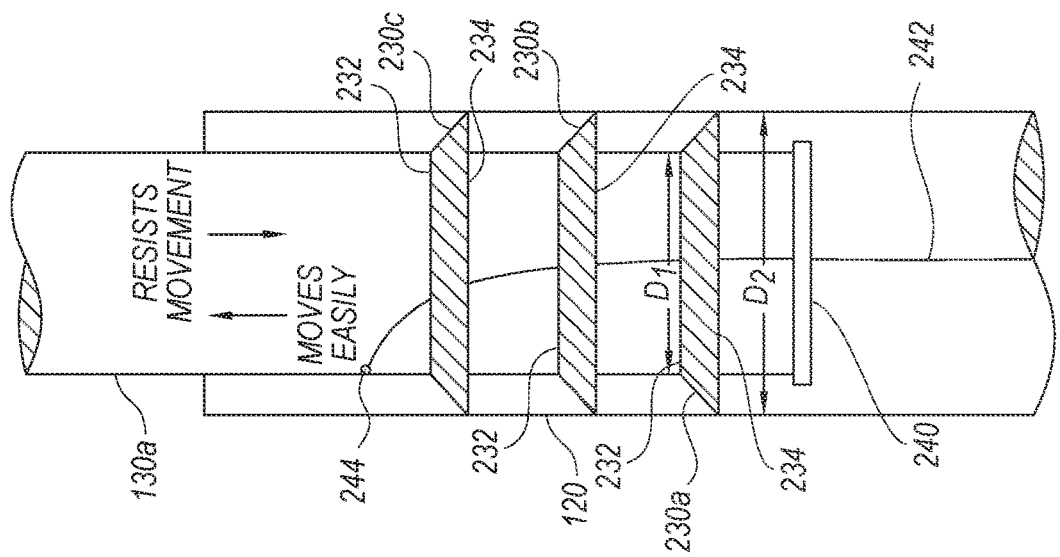
FIG. 2B is an enlarged partially schematic view of a proximal region of the aircraft capture member of FIGS. 1 and 2B configured in accordance with an embodiment of the present technology.
Figure 2A:
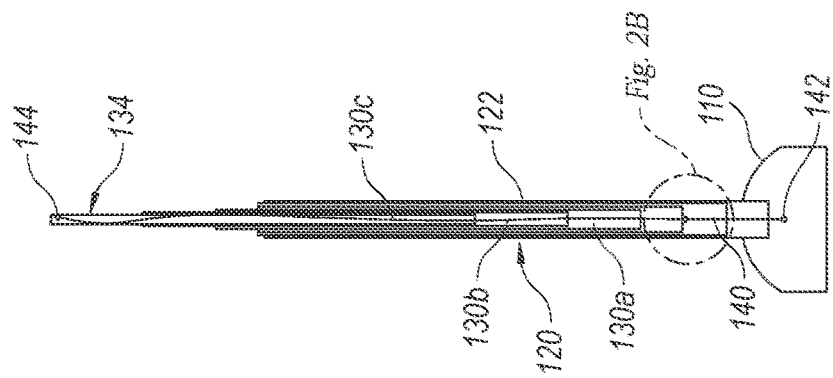
FIG. 2A is a partially schematic illustration of the aircraft capture member of FIG. 1 in a collapsed/compressed arrangement.

FIG. 2A is a partially schematic illustration of the aircraft capture member 120 in the compressed arrangement. For sake of illustration, the aircraft capture member 120 is shown in a generally vertical orientation. As noted above, however, in some embodiments the aircraft capture member 120 may be canted or angled toward the aircraft's flight path before capture (as shown in FIG. 1 and FIG. 4A below), and then pivotably and/or rotatably move relative to base assembly 110 during and after capture operations. As mentioned previously, the elongated capture member 120 is a flexible telescoping rod 122 including discrete segments 130 arranged in a telescoping or articulating arrangement relative to each other. The flexible telescoping rod 122, for example, can be a tubular hollow rod having a variety of different dimensions and configurations depending upon the desired operational requirements. In the illustrated embodiment, for example, the flexible telescoping rod 122 includes three segments identified individually as 130a, 130b, and 130c. In other embodiments, however, the flexible telescoping rod 122 may include a different number of segments 130 (more segments or fewer segments) and/or the segments may have different sizes relative to each other. The multiple segments 130a-c are aligned with each other (at least initially before capture and recovery operations) and extend along a longitudinal axis of the flexible telescoping rod 122.

Referring to FIGS. 1 and 2A together, one feature of the system 100 is that an elevation of the aircraft capture member 120 (when in its compact intercept state) only needs to be as high as the anticipated capture elevation for the aircraft. Further, because the rod 122 includes a telescoping/articulating arrangement, the overall length of the rod 122 (when in its compact state for storage and/or transport) can be significantly less than many existing aircraft capture devices that require much greater deployment elevations. Accordingly, the aircraft capture member 120 is expected to be significantly easier to store and/or transport than larger, existing aircraft capture systems. Moreover, the aircraft may be easier to retrieve after capture because of the reduced capture elevation when the aircraft capture member is in the compressed state.

Referring again to FIGS. 1 and 2A together, the base assembly 110 (shown schematically) may comprise a number of different structures configured to pivotably support the aircraft support member 120 during capture and recovery operations. The base assembly 110, for example, may be configured to rest on the ground or a suitable support platform (e.g., a truck or other suitable land vehicle, a boat or other water vessel, a building, or other suitable vehicles and/or structures). In other embodiments, the base assembly 110 can have a different arrangement and/or can be composed of different materials.

The base assembly 110 is configured to (a) releasably hold the telescoping rod 122 at a desired position/orientation before capture operations (e.g., canted or angled relative to the ground and toward the aircraft's flight path), and (b) support the telescoping rod 122 during capture and recovery as the telescoping rod 122 pivots and then extends to its fully extended/payed out arrangement. Throughout the capture/recovery operation, the base assembly 110 is configured to help prevent the aircraft and its components from hitting the ground or surrounding structures with excessive force, while also enabling quick and easy installation and takedown of the system 100 itself in a wide variety of locations/environments. Further details regarding various embodiments of the base assembly are described in greater detail below.

The aircraft capture member 120 may also include an anchor line 140 extending from the base assembly 110 through the flexible rod 122. The anchor line 140, for example, can be anchored or secured within the base assembly 110 at anchor point 142 and extend through an inner channel or lumen of the telescoping rod 122 to one or more additional anchor points within the rod. In the illustrated embodiment, for example, the anchor line 140 extends to an anchor point 144 proximate the distal or free end 134 of the telescoping rod 122. In other embodiments, however, the anchor line 140 may be attached to different portion(s) of the telescoping rod 122. For example, in some embodiments the aircraft capture member 120 may include a first anchor line 140 extending between the base assembly 110 and the distal anchor point 144, and additional second anchor line(s) (not shown) extending between the base assembly 110 and the individual segments 130a-c. The second anchor lines are an optional component that may not be included in all embodiments.

The anchor line 140 may comprise a resilient line or cable (e.g., an elastic cord) sized and adapted to help the aircraft capture member 120 absorb capture/recovery loads from an unmanned aircraft during operation. Referring to FIGS. 1 and 2A together, for example, as the aircraft capture member 120 extends or pays out during capture operations, the anchor line 140 extends as well until the flexible rod 122 is at its fully extended/payed out arrangement. The anchor line 140 (which is anchored between the base assembly 110 and the distal anchor point 144 in the illustrated embodiment) is expected to help ensure that the telescoping rod 122 does not extend beyond its predetermined elongation limit. The anchor line 140 is further expected to strengthen the telescoping rod 122 and make the rod 122 more resilient in tension along a longitudinal axis of the rod 122 as it moves between the retracted and extended arrangements. The anchor line 140 is also adapted to transfer capture/recovery loads from the aircraft to the base assembly 110 during capture/recovery operations. In some embodiments, for example, the anchor line 140 may carry all or substantially all of the tension loads during capture/recovery operations, while additional forces are carried by the rod 122 and base assembly 110.

In other embodiments, the anchor line 140 may also comprise a non-elastic element. For example, the anchor line 140 may have a predefined size and be composed of non-elastic material(s) tuned for particular recovery forces during aircraft capture/recovery operations of the aircraft capture member 120.

Referring to FIGS. 1 and 2A together, the telescoping rod 122 may be composed of a carbon fiber material, a carbon graphite material, fiberglass, other composite materials, such as carbon/graphite or graphite/boron composites. The selected material should have the strength and flexibility to intercept and capture an unmanned aircraft when it flies into and engages the telescoping rod 122 and, once captured, to suspend the aircraft by one of its wings or another suitable capture mechanism carried by the aircraft. In other embodiments, the telescoping rod 122 may be composed of bamboo or other suitable material(s) having the desired material characteristics to support aircraft recovery operations.

FIG. 2B is an enlarged partially schematic view of a proximal region (area 2B) of the aircraft capture member 120 with the telescoping rod 122 in a fully collapsed/retracted state. For purposes of illustration, certain features of the aircraft capture member 120 are not shown or are shown transparently. In this embodiment, the aircraft capture member 120 includes one or more engagement features 230 carried by the individual segment(s) 130. As illustrated, for example, three engagement features 230 (shown individual as a first engagement feature 230a, a second engagement feature 230b, and a third engagement feature 230c) carried by the first segment 130a of the telescoping rod 122.

Although only the first segment 130a is shown, it will be appreciated that the other segments 130b and 130c (FIG. 2A) of the telescoping rod 122 may also include engagement feature(s) 230. It will be further appreciated that in other embodiments a different number of engagement features 230 may be used (e.g., more or fewer engagement features 230 per segment 130). Alternatively, one or more segments 130 may not include any engagement features 230.

The individual engagement features 230 are positioned at or near a proximal region of the corresponding segment 130

(e.g., segment 130a). Each engagement feature 230 includes a first or leading side 232 facing a distal end of the telescoping rod 122, and a second or trailing side 234 facing a proximal end of the telescoping rod 122 and the base assembly 110. The engagement features 230 may comprise, for example, annular rings that slide onto the corresponding segment 130 and are sized such a diameter $D_1$ of the first side 232 generally corresponds to a diameter of the segments 130, and a diameter $D_2$ of the second side 234 corresponds to an inner wall diameter of the aircraft capture member 120. The engagement features 230, for example, may be sized to provide a tight/snug fit with the inner wall surface of the aircraft capture member 120 such that frictional forces between the components may be used to help absorb energy from an aircraft during capture/recovery operations and help prevent the telescoping rod 122 from inadvertently paying out too rapidly during such operations.

The engagement member(s) 230 are configured such that segment 130a of the telescoping rod 122 (a) moves easily in the distal direction and (b) resists movement in the proximal direction (as shown by the arrows). One aspect of this arrangement is that it enables the telescoping rod 122 to move easily between the compressed intercept arrangement and the elongated recovery arrangement in which the telescoping rod 122 is fully extended/payed out. At the same time, as noted above, the engagement features 130 are configured to restrict movement of the telescoping rod 122 (via friction/pressure) of the individual segments 130 of the telescoping rod 122 as the rod is transformed from the recovery arrangement back to the compressed arrangement. The engagement features 130 are not configured to completely inhibit movement—the telescoping rod 122 can be transformed between the compressed and extended states multiple times—but rather inhibit compressive movement of the rod 122 to ensure that the rod 122 does not inadvertently collapse or compress during operation and damage the aircraft and/or injure the operator.

As further shown in FIG. 2B, the segment 130a may also include a cap 240 at a proximal end of the segment 130a. In some embodiments, an anchor line 242 may extend from the base assembly 110 (FIG. 2A), through an aperture in the cap 240 and through a proximal region of the segment 130a to an anchor site 244 on inner wall of the segment 130a. The anchor line 242, for example, may comprise a stretchable or shock cord/line (e.g., a bungee cord) to help prevent inadvertent extension of the segment 130a beyond a predefined extension limit. This anchor line 242 may be utilized in addition to, or in lieu of, the anchor lines 140 discussed above with reference to FIG. 2A. In further embodiments, additional anchor line(s) or internal restraint line(s) may be used to restrict or limit travel of internal segments 130 beyond predefined limits and help prevent failure of the telescoping rod 122 during capture/recovery operations. Moreover, in some embodiments one or more of the segments 130 may be tapered to help control movement/travel of the individual segments relative to each other during operation.

In the illustrated embodiment, the engagement features 230 are composed of a rubber material. In other embodiments, however, the engagement features 230 may be composed of other suitable materials (e.g., compressible foam materials, polymer materials, etc., designed to provide suitable resistance/force during operation). For example, in one embodiment the engagement features 230 may be composed, at least in part, of casing from a high-performance tension line (e.g., woven casings used in sailing rope, line, sheets, and halyards). In still other embodiments, the engagement features 230 may be composed of other suitable material(s). It will be further appreciated that engagement features 230 are optional components that may not be utilized in some embodiments.

Figure 2C:
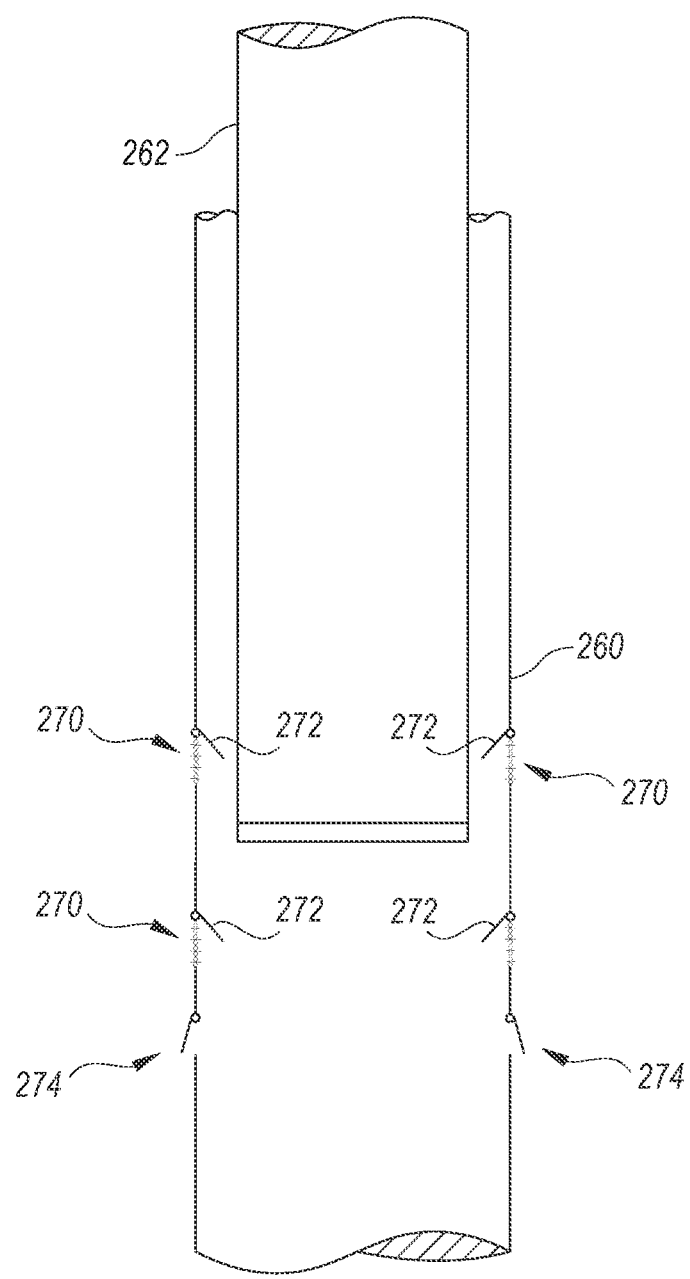
FIG. 2C is an enlarged partially schematic view of a proximal region of an aircraft capture member including a telescoping rod configured in accordance with another embodiment of the present technology.

FIG. 2C is an enlarged partially schematic view of a proximal region of an aircraft capture member 260 including a telescoping rod 262 configured in accordance with another embodiment of the present technology. For purposes of illustration (as with FIG. 2B described above), certain features of the aircraft capture member 260 are not shown or are shown transparently. The aircraft capture member 260 in the illustrated embodiment differs from the aircraft capture member 120 described above in the way that movement of the individual segments of the telescoping rod 262 is controlled. In particular, rather than engagement features 230 carried by the individual segments 130 (as with the embodiment shown in FIG. 2B), the aircraft capture member 260 includes a pneumatic resistance control system configured to control movement of the individual segments of the telescoping rod 262 relative to each other.

In particular, the aircraft capture member 260 includes one or more openings or perforations 270 (four are shown in the illustrated embodiment) at a proximal region of the aircraft capture member 260. Although four openings 270 are shown, in other embodiments the aircraft capture member 260 may include a different number of openings 270, the openings 270 may have different sizes/shapes and/or a different arrangement relative to each other, and the openings 270 may be positioned at different portions of each element or segment of the aircraft capture member 260. A valve assembly or flap 272 is positioned at each opening/perforation 270 to control or limit ingress/egress of air or other fluid through the corresponding opening 270 and into an inner portion or chamber of the aircraft capture member 260. One or more of the valve assemblies 272 may optionally include a spring or other suitable actuator to control movement during operation. In some embodiments, for example, the valve assemblies 272 comprise one-way valves that allow air into the openings 270 upon extension of the telescoping rod 262 (in a distal direction), and the valve assemblies 272 then sealably close automatically (e.g., due to pressure within the chamber) and do not allow the air to escape. In this way, the telescoping rod 262 can be quickly extended/payed out in the distal direction as the telescoping rod 262 receives and captures an aircraft and momentum energy from the aircraft is transferred to the system. The telescoping rod 262 is then restricted/inhibited from inadvertent retraction or collapse until the trapped air within the internal chamber of the rod is released/exhausted via exhaust openings or ports 274, thereby allowing retraction of the rod 262. The openings 274 may also include flaps or valves to sealably close the openings 274. In other embodiments, the valve assemblies 272 may comprise two-way valves configured to allow air both in and out of the valve during operation. The valve assemblies 272 may comprise passive valves or actively managed valves (e.g., electromechanical, piezoelectric, etc.).

Although only the first segment of the aircraft capture member 260 is shown in FIG. 2C, it will be appreciated that other portions of the aircraft capture member 260 may also include features similar to that that shown in FIG. 2C. It will be further appreciated that in other embodiments one or more portions of the aircraft capture member 260 may not include openings/valve assemblies or may include different features to control/limit movement of the segments(s) during operation.

Figure 3G:
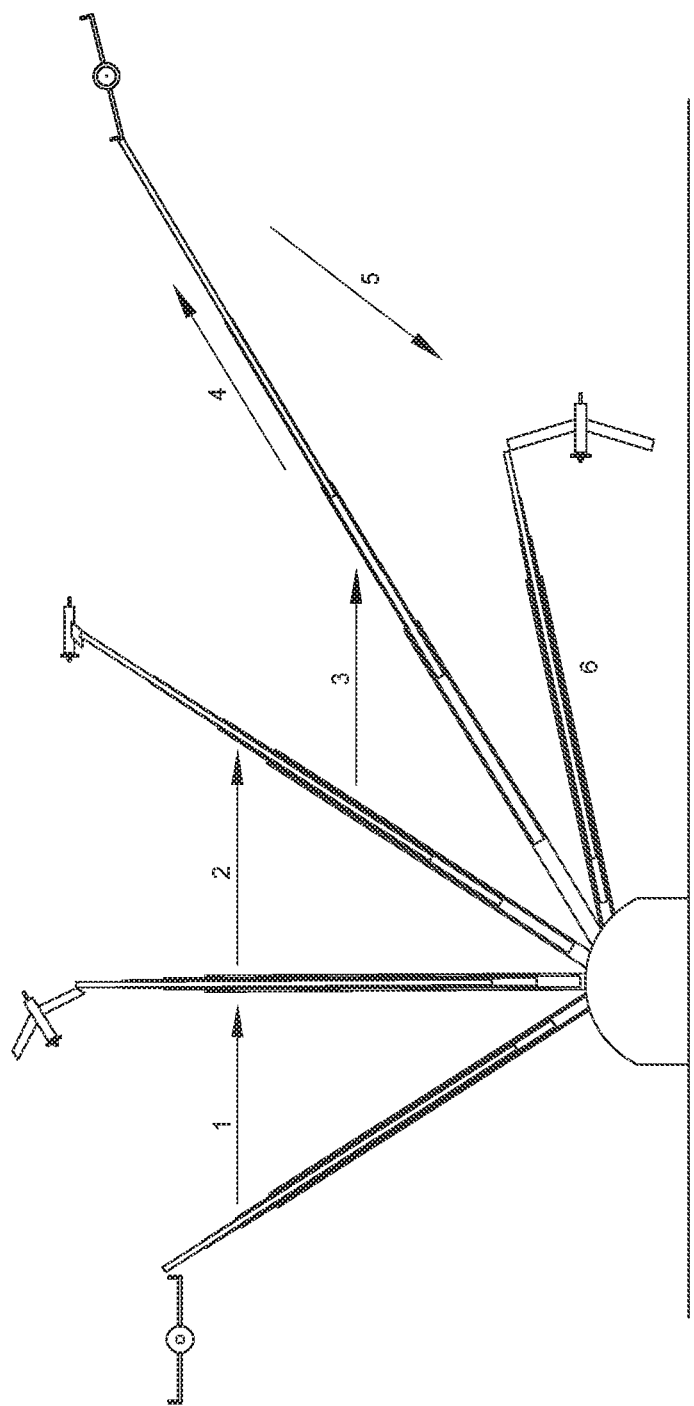

FIGS. 3A-3G are partially schematic views indicating a sequence of events when operating the system 100 to recover an unmanned aircraft 300 in flight and controlling post-recovery motion of the aircraft 300 in accordance with an embodiment of the disclosure. FIG. 3A, for example, is an overhead or plan view of the aircraft 300 approaching the system 100 before capture. In this embodiment, the flexible telescoping rod 122 is angled or canted toward the aircraft 300 at a desired angle relative to the ground or local support surface upon which the base assembly 110 is positioned. The angle is variable and can be modified based on the particular characteristics of the aircraft being captured and/or local environmental conditions. One feature of this arrangement is that it is expected to provide a large range of rotational or pivotal movement for the flexible telescoping rod 122 after engagement and capture of the aircraft 300 (as described below with reference to FIGS. 3C-3G). Further, as noted previously, this arrangement is expected to position a majority of the telescoping rod 122 out of the flight path of the aircraft 300 so that if the aircraft is on a non-optimal flight path or a flight path that does not provide optimal intersection with the telescoping rod 122, the aircraft 300 can circle around again for capture without inadvertently contacting the rod or other components of the system 100.

In operation, the system 100 can be deployed to a desired location and configured as the primary device for capture and recovery operations. The system 100, for example, may be a modular system and an operator can transport the system components in a generally disassembled or partially assembled state to a landing zone and assemble the components on-site. In another embodiment, however, the system 100 may be transported to the desired landing zone in a generally assembled configuration.

Another aspect of the system 100 is that it is a scalable system and can be used as a primary aircraft recovery system for a variety of different aircraft configurations and/or arrangements. For example, as mentioned above, the telescoping rod 122 can have an overall length and cross-sectional dimension based, at least in part, on the particular dimensions of the aircraft to be recovered, the operational conditions of the aircraft, and/or the operational considerations of the system 100 (e.g., the location of the system 100, the desired transportability of the system 100, etc.). For any selected scale, the system 100 is also expected to "deploy in fractions," depending on the kinetic energy of the returning aircraft, and is further expected to react proportionally until the aircraft is fully arrested.

Referring next to FIG. 3B, the aircraft 300 intercepts an aircraft capture element 138 extending from the distal free end 134 of the telescoping rod 122. More specifically, the aircraft 300 is flown such that a leading edge 304 of wing 302 of the aircraft 300 engages the capture element 138. The capture element 138 is a flexible pole or rod coupled to and extending from the telescoping rod 122. Further details regarding additional embodiments of suitable capture elements are described below with reference to FIGS. 7-10.

Referring now to FIG. 3C, an engagement feature (not shown) at an outboard edge of the wing 302 receives and retains the capture element 138. The momentum of the aircraft 300 causes the telescoping rod 122 to begin pivotably moving relative to the base assembly 110. In FIG. 3D, for example, the telescoping rod 122 has pivotably and/or rotatably moved from its initial angled arrangement leaning into the aircraft's approach flight path, past a generally vertical arrangement, and to an intermediate position in which the telescoping rod 122 is angled/canted away from the aircraft's approach flight path. The aircraft 300 rapidly decelerates after capture and energy from the aircraft 300 is transferred from the aircraft 300 to the telescoping rod 122, which begins to extend or pay out as it rotates/pivots relative to the base assembly 110. In some embodiments, the base assembly 110 may also be adapted to move or rotate in a predetermined manner to help absorb the aircraft's energy.

Referring next to FIG. 3E, recovery of the aircraft 300 continues with the first end 132 of the telescoping rod 122 continuing to pivot and/or rotatably move relative to the base assembly 110 in response to the aircraft's momentum. The telescoping rod 122 has now further pivoted to a more angled/canted arrangement than that shown in FIG. 3D. The telescoping rod 122 has now also transformed into a fully elongated/payed out arrangement with individual segments 130 (five segments are shown in the illustrated embodiment as 130a-e) extending lengthwise along a longitudinal axis of the rod 122. It will be appreciated that the extent of pivoting/rotation of the telescoping rod 122 about the base assembly 110 and the extent of elongation for the telescoping rod 122 may be closely controlled and tailored for particular applications based, at least in part, on the characteristics of the aircraft being captured, the local environmental conditions, and/or the size/configuration/material(s) of the telescoping rod 122 itself.

As noted previously, the system 100 may also include the anchor line 140 (which, for purposes of clarity, is only shown in FIG. 3E) extending from the base assembly 110 through the flexible rod 122 and to an anchor point at or near the distal or free end 134 of the rod 122. The anchor line 140 is configured to (a) prevent the telescoping rode 122 from extending beyond is elongation limit, (b) strengthen the telescoping rod 122 and make the rod more resilient along the longitudinal axis of the rod 122, and (c) transfer capture/recovery loads from the aircraft 300 to the base assembly 110 during the capture/recovery operation. Moreover, in embodiments including engagement features 230 (FIG. 2B) or pneumatic control elements (FIG. 2C), such features are also expected to also provide decelerating force to slow the captured aircraft as the telescoping rod 122 is payed out, as well as absorbing kinetic energy from the aircraft 300 during capture/recovery.

Referring now to FIG. 3F, the forward progress of the aircraft 300 is stopped and the aircraft has come to a complete or approximately complete stop and remains secured to the telescoping rod 122. The rod 122 has also been transformed from the fully extended arrangement (FIG. 3E) back to a compact arrangement for retrieval of the aircraft 300. In the illustrated embodiment, the aircraft 300 is suspended above the ground and away from other external structures after capture and can be quickly and easily retrieved from the telescoping rod 122 by an operator or ground personnel (not shown) for refueling, refurbishment, additional operations, and/or storage. The telescoping rod 122 may be sized and configured to prevent the now-captured aircraft 300 from striking the surface on which the system 100 is placed. For example, as shown in FIG. 3F, the telescoping rod 122 is sized and angled relative to the support surface such that the lowest portion of the aircraft 300 (i.e., the tip of the wing opposite the wing that is engaged with the telescoping rod 122) remains high enough to avoid striking the support surface/ground. As stated above, the system 100 is configured to provide precise control of the forces associated with capture and recovery of the aircraft 300, and help inhibit, reduce, and/or eliminate damage to the aircraft 300 during capture/recovery operations.

FIG. 3G is a partially schematic side view of the system 100 illustrating the sequence of events described above with reference to FIGS. 3A-3F for intercepting the unmanned aircraft in flight. In particular, as best seen in the sequence shown in FIG. 3G, after the aircraft is intercepted by and engages the telescoping rod (step 1), the rod begins to pivot/articulate and then pay out due to the aircraft's momentum (steps 2-4) until the rod is fully payed out. The rod can then be retracted (step 5) and the aircraft is suspended for retrieval (step 6).

One feature of embodiments of the system 100 and methods described above with reference to FIGS. 1-3G is that the system 100 can be quickly deployed and configured for capture/recovery operations of unmanned aircraft in a variety of different environments and operational conditions. Many conventional recovery systems, for example, require elaborate and complex components that are relatively immobile and require significant time and expense for deployment. In contrast with such conventional systems, the system 100 comprises a telescoping rod 122 that can be easily transported in a compact, low-profile arrangement. The system 100 further comprises other modular components that can be easily transported in a partially assembled or disassembled state to a wide variety of different operational environments, and quickly assembled and deployed for capture/recovery operations.

Another feature of embodiments of the system 100 is that the system 100 can be used to recover aircraft having a variety of different features/configurations. For example, the telescoping rod 122 can be sized/adapted to capture aircraft having a variety of different sizes, operating weights, and configurations. Likewise, the base assembly 110 can be adapted to support capture/recovery operations of aircraft having a wide variety of different sizes and configurations. Furthermore, because the system 100 can be used with a variety of different aircraft, a single system 100 may be deployed and utilized for capture/recovery operations in a particular area or region for an entire fleet of different unmanned aircraft. Another feature of the system 100 is its relatively small footprint as compared with many conventional landing/recovery systems. The system's small footprint is expected to allow the system 100 to be used in a wide variety of different operational environments and conditions where use of many conventional systems would be impracticable.

Figure 4B:
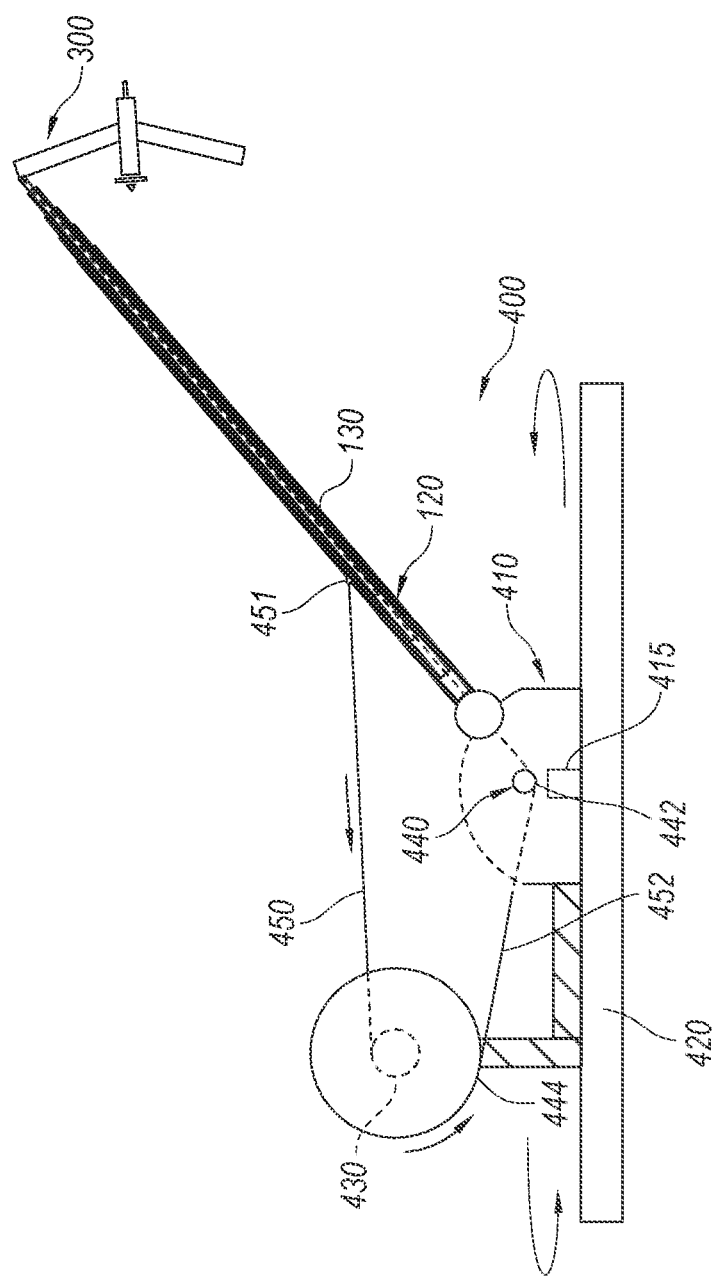

FIGS. 4A and 4B are partially schematic illustrations of an aircraft recovery system 400 configured to recover the unmanned aircraft 300 (or another suitable aircraft) in flight and control post-recovery motion of the aircraft in accordance with an embodiment of the present technology. The aircraft recovery system 400 can include several features generally similar to the system 100 described above. The system 400 can include, for example, a base assembly 410 and the elongated aircraft capture member 120 rotatably/pivotably coupled to and extending from the base assembly 410. The aircraft capture member 120 can include, for example, the telescoping rod arrangement described above including a plurality of discrete individual tubular segments nested together and configured to be elongated/extended during operation, and then collapsed back to the initial compact state after recovery and capture of the aircraft 300.

The system 400 differs from the system 100 in that the base assembly 410 has a different configuration than the base assembly 110. The base assembly 410, for example, includes a base portion 420 engaged with the aircraft capture member 120 via axle 415. The aircraft capture member 120 and base portion 420 are rotatably movable relative to each other (as shown by the arrows) about the axle 415. The base assembly 410 also includes a first reel mechanism 430 and a second reel mechanism 440. In the illustrated embodiment, the base portion 420 is positioned to support the reel mechanisms 430 and 440. In other embodiments, however, the base portion 420 may have a different arrangement relative to the other components of the base assembly 410 and/or the base portion 420 may be positioned to support different components.

The first reel mechanism 430 comprises a first take-up reel engaged with a tension line 450. The tension line 450 is attached between an anchor point 451 on the aircraft capture member 120 and extends between the anchor point 451 and the first reel mechanism 430. The second reel mechanism 440 comprises a pulley 442 and a second take-up reel 444. In the illustrated embodiment, the second take-up reel 444 is also supported, at least in part, by the base portion 420. The second reel mechanism 440 is engaged with a line 452 extending through the aircraft capture member 120 from (a) an anchor point (not shown) adjacent a distal end of the aircraft capture member 120, (b) through the entire telescoping rod to the pulley 442, and (c) to the second take-up reel 444. The line 452, for example, may be similar to the anchor line 140 described above with reference to FIGS. 1-2B, or the line 452 may have a different arrangement and/or features. It will be appreciated that in other embodiments the first and second reel mechanisms 430 and 440 may have a different arrangement relative to each other and/or the other components of the system 400. For example, one or both reel mechanisms may be positioned at a different location relative to the base assembly 410, the base portion 420, and/or the aircraft capture member 120.

In some embodiments, the system 400 may further comprise one or more additional reel mechanisms, such as an actively managed servo (not shown) or other suitable reel mechanism(s). A servo, for example, may be used in conjunction with the second reel mechanism 440 to provide additional restraining action to the aircraft capture member 120 and/or the line 452 during capture/recovery operations. In still other embodiments, alternative active torque mechanisms may be used in conjunction with the reel mechanisms. The servo and other reel mechanisms are optional components that may not be included in some embodiments.

In the arrangement shown in FIG. 4A, the system 400 is shown in the middle of capture/recovery operation of the aircraft 300. In particular, the aircraft 300 has already flown into the aircraft capture member 120 and engaged the capture member at the distal end of the telescoping rod 122. Momentum from the aircraft 300 has caused the telescoping rod 122 to elongate from its compact intercept arrangement (FIG. 3A) to the active state shown in FIG. 4A in which the telescoping rod 122 is partially elongated. During elongation, the momentum from the aircraft 300 has also caused the aircraft capture member 120 to pivotably move about the base assembly 410 and bend as shown, thereby allowing the aircraft capture member 120 to absorb additional forces from the aircraft 300.

As the aircraft capture member 120 pivots/bends, the tension line 450 is engaged and the first reel mechanism 300 (the first take-up reel) winds up and keeps tension on the tension line 450 to counteract the bending/pulling as a result of capture operations. The second reel mechanism 440 may also be utilized to wind up/manage the line 452 during elongation/bending of the aircraft capture member 120. The pulley 442 and second take-up reel 444, for example, may be configured to use the energy of capture to pay out/wind up line 452 and keep a desired level of tension in the line 452 to help manage the forces associated with capture/recovery of the aircraft 300, while also preventing/inhibiting the aircraft 300 from over rotating the aircraft capture member 120 or being inadvertently tossed about or damaged during recovery operations.

Referring next to FIG. 4B, for example, the capture/recovery operation for aircraft 300 is almost complete and the first and second reel mechanisms 430 and 440 have continued to wind up corresponding lines 450 and 452, respectively, to maintain desired tension in both lines. This arrangement is expected to help keep the aircraft 300 at a desired position relative to the aircraft capture member 120 and the above the ground, thereby preventing inadvertent movement of the aircraft 300 that could result in damage to the aircraft itself and/or the system 400. In this state, the aircraft 300 can be quickly and easily retrieved from the aircraft capture member by an operator or other ground personnel (not shown).

One aspect of the embodiments shown in FIGS. 4A and 4B is that actively managing the tension in tension lines 450 and 452 via the corresponding reel mechanisms is expected to help effectively and efficiently transfer momentum and capture forces from the aircraft 300 to the system 400 during capture/recovery operations, while also preventing the aircraft capture member 120 from excessive bending/rotation that may break the capture member or damage the aircraft 300.

Another feature of the embodiments shown in FIGS. 4A and 4B is that the first and second reel mechanisms 430 and 440 are expected to provide precise control of the forces associated with capture and recovery of the aircraft. In this way, recovery and energy management can be closely controlled (e.g., via the reel mechanisms, tension in lines 450 and 452) throughout the capture and recovery process. This feature is expected to help inhibit and/or prevent damage to the aircraft during capture and recovery operations.

Figure 5A:
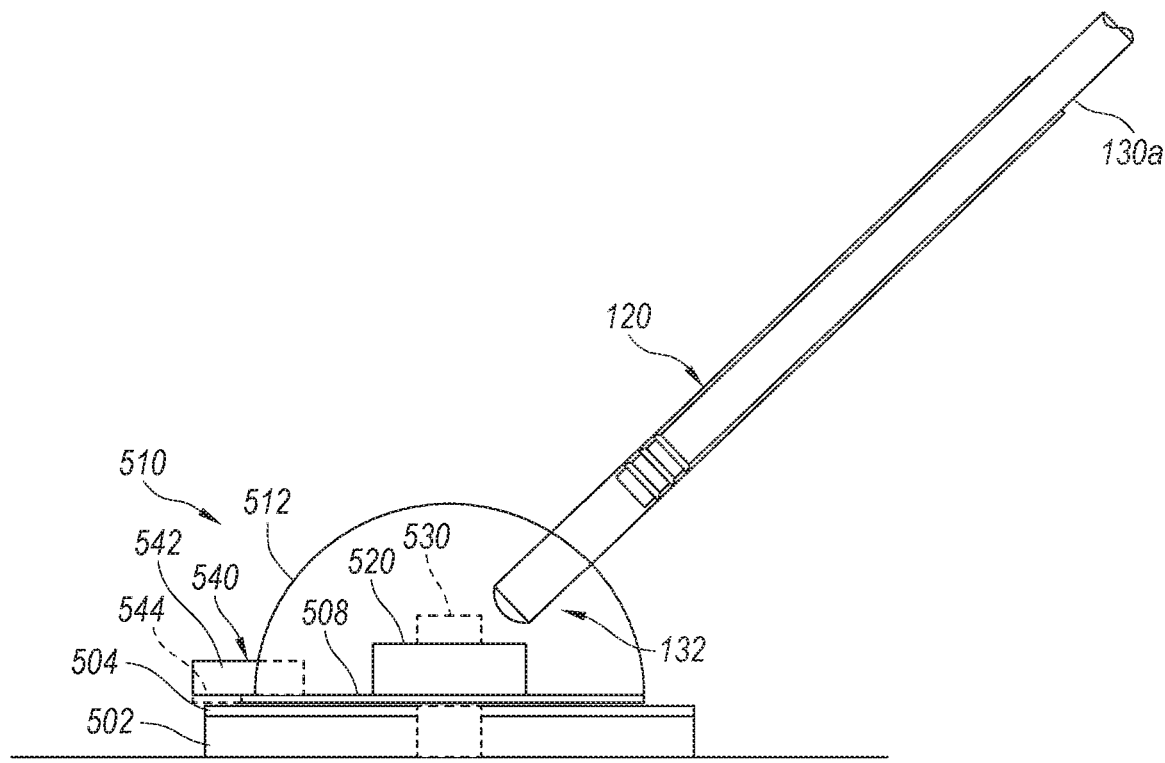
FIGS. 5A and 5B are partially schematic illustrations of a base assembly of an aircraft recovery system configured in accordance with another embodiment of the present technology.
Figure 5B:
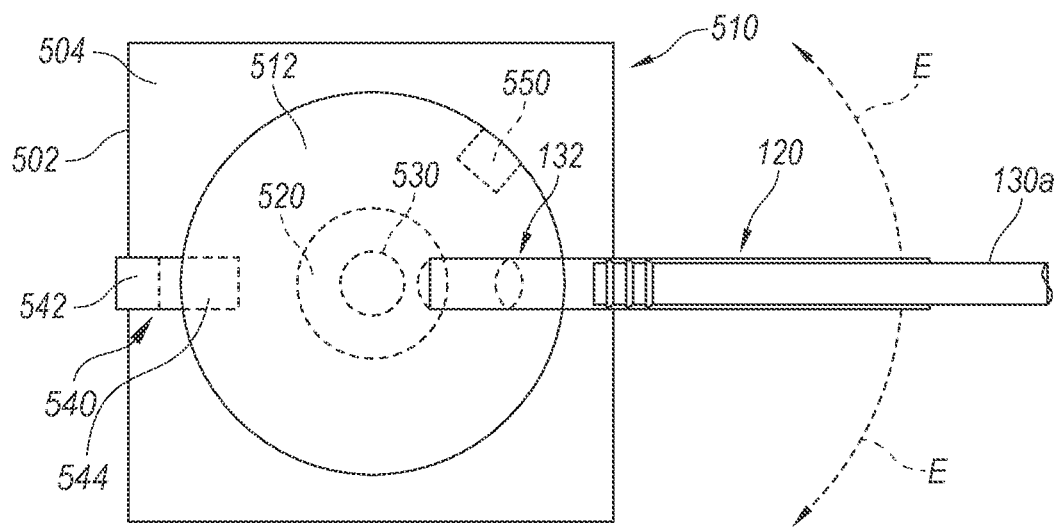

FIGS. 5A and 5B are partially schematic illustrations of a base assembly 510 of an aircraft recovery system configured in accordance with another embodiment of the present technology. More specifically, FIG. 5A is a side view and FIG. 5B is a top view of the base assembly 510. For purposes of illustration, certain components of the base assembly 510 are shown transparently to provide a better understanding of the internal arrangements of such components relative to each other in the base assembly 510. The base assembly 510 may be used with the system 100 described above or other suitable aircraft recovery systems. In the illustrated embodiment, for example, the base assembly 510 is configured to receive and carry the aircraft capture member 120 for capture/recovery operations. In other embodiments, however, the base assembly 510 may be used with other suitable aircraft recovery systems having different components/features.

The base assembly 510 comprises a platform 502 and a housing 512 rotatably carried by the platform 502. The platform 502 is adapted to be coupled to or engaged with the ground or another suitable support platform. The platform 502 may comprise, for example, a rectilinear or generally square shape (as shown) or other suitable shapes. The housing 512 is rotatably carried about the platform 502 via an axle 530. In this way, the housing 512 (and the aircraft capture member 120 carried thereby) can rotatably move about the platform 502 during capture/recovery operations as shown by the arrow E in FIG. 5B. In some embodiment, a motor 520 may also be operably coupled to the axle 530 and configured to assist with/control rotational movement of the housing 512 about the platform 502. The motor 520, however, is an optional component that may not be used in some embodiments of the present technology.

In the illustrated embodiment, the base assembly 510 further comprises a first coating or first layer 504 between the platform 502 and the housing 512. The first coating 504, for example, may be composed of a resistive material that is configured to function as a braking surface or pad to help resist rotation of the housing 512 during operation (as described in greater detail below). In some embodiments, the base assembly 510 may also include a second coating or second layer 508 attached to a bottom surface of the housing 512 and positioned between the housing 512 and the first layer 504. The second coating 508 is also composed of a resistive material and is positioned to contact the first coating 504 and function as a brake pad to inhibit/limit rotational movement of the housing 512 about a longitudinal axis of the axle 530. The first coating 504 and second coating 508 are both optional components, and one or both coatings may not be used in other embodiments of the base assembly 510.

The base assembly 510 may also include a braking assembly 540 configured to selectively control or limit rotational movement of the housing 512 and aircraft capture member 120. The braking assembly 540 includes, for example, a brake actuating mechanism 542 and a brake pad 544. As best seen in FIG. 5A, the brake pad 544 may be engaged/disengaged with the first coating 504 on the platform 502 and/or the platform 502 itself via signals from the brake actuating mechanism 542. The braking assembly 540 is an optional component that may not be included in some embodiments of the base assembly 510.

As best seen in FIG. 5B, the base assembly 510 may also include a stop or rotation limiting feature 550 positioned to restrict rotational travel of the housing 512 and attached aircraft capture member 120 as the components rotate (as shown by the arrow E) about a longitudinal axis of the axle 530. The stop 550 can be positioned at a desired location on the platform 502 to limit rotational movement with a desired range. The selected range, for example, may vary depending upon the size/configuration of the aircraft being captured, the external environmental conditions, the particular configuration of the base assembly 510, and/or other variables associated with capture/recovery operations.

Figure 6:
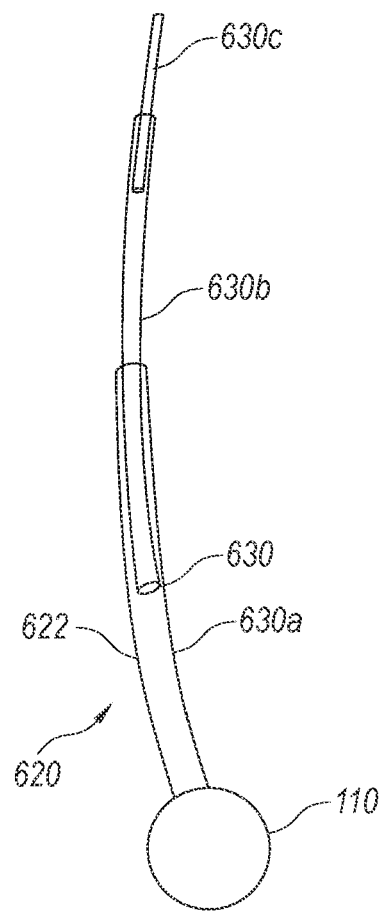
FIG. 6 is a partially schematic overhead view of an aircraft recovery system configured in accordance with yet another embodiment of the present technology.

FIG. 6 is a partially schematic overhead view of an aircraft capture member 620 configured in accordance with another embodiment of the present technology. The aircraft capture member 620 can include several features generally similar to the aircraft capture member 120 described above with reference to FIGS. 1 and 2A. For example, the aircraft capture member 620 includes an elongated telescoping rod 622 with a plurality of discrete segments or sections 630 having a telescoping or articulating arrangement relative to each other. In the embodiment illustrated in FIG. 6, the telescoping rod 622 includes three segments identified individually as 630a, 630b, and 630c. In other embodiments, however, the flexible telescoping rod 622 may include a different number of segments 630 and/or the segments 630 may have different sizes relative to each other. Further, as with the aircraft capture member 120, the aircraft capture member 620 may comprise a tubular hollow rod having a variety of different dimensions and configurations depending upon the desired operational requirements. Moreover, the telescoping rod 622 can have material characteristics and features generally similar to the telescoping rod 122 described above.

The aircraft capture member 620 differs from the aircraft capture member 120 in that the aircraft capture member 620 has an initially curved or non-linear arrangement (rather than the generally linear arrangement of the aircraft capture member 120). More specifically, as shown in FIG. 6, each segment 630*a*-*c* has a curved/non-linear configuration and the individual segments 620 of the telescoping rod 622 are arranged relative to each other such that they are transformable between a nested, compact arrangement and an elongated arrangement. The curved segments 630*a*-*c* may be shaped in such a way that, although they are curved, the segments 630*a*-*c* will smoothly deploy (i.e., elongate) during capture/recovery operations using momentum energy from the aircraft, and then smoothly retract after capture and allow the aircraft to be quickly and easily retrieved.

FIGS. 7-10 are illustrations of capture elements or capture assemblies configured in accordance with various embodiments of the present technology. The capture elements may be carried by or attached to a distal region of the aircraft capture members disclosed herein (or other suitable aircraft capture members) and used with the systems described herein for capture and recovery unmanned aircraft. In particular, the capture elements are expected to help further ensure that that the aircraft capture member securely engages the aircraft during the capture/recovery process and that the aircraft's momentum does not cause the aircraft to merely bounce off or otherwise not adequately engage the aircraft during operation.

Each of the capture elements disclosed herein are discrete, separate components that may be affixed to the distal end of the aircraft capture member before initiating capture operations, and then subsequently removed after recovering and removing the aircraft from the system. In other embodiments, however, the capture elements may be integral components of the aircraft capture member and fixedly attached to the distal end thereof both during operation and stowage of the aircraft capture member between operations.

Figure 7:
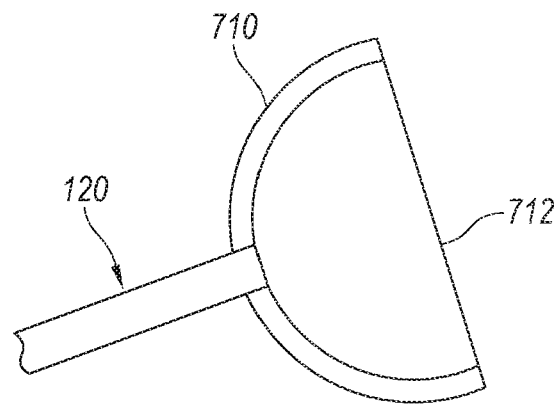
FIG. 7 is a partially schematic illustration of a capture element carried by an aircraft capture member and configured in accordance with an embodiment of the present technology.

FIG. 7, for example, is a partially schematic illustration of capture element 710 extending from a distal end of aircraft capture member 120. The capture element 710 in the illustrated embodiment comprises a generally semi-circular shape or "C" shape. Although the capture element 710 is shown with a generally "C" shaped profile, it will be appreciated that a variety other shapes may be suitable (e.g., elliptical, parabolic, circular, etc.). The capture element 710 further comprises a capture line 712 extending transversely between distal end portions of the capture element 710. During operation, the capture line 712 is configured to contact and securely engage with engagement feature(s) at or near tips of the wings of the aircraft after the wing contacts the capture line 712.

The capture line 712 may be composed of rope, cable, or another thin flexible material with sufficient strength to support the aircraft during recovery/capture operations. In one embodiment, for example, the capture line 712 may be composed, at least in part, of casing from a high-performance tension line (e.g., woven casings used in sailing rope, line, sheets, and halyards). In still other embodiments, the capture line 712 may be composed of other suitable material(s). In some embodiments, one or more portions of the capture element 710 may be composed of a core of carbon fiber material or another suitable high-performance material with a casing or sheath of high-performance woven material (e.g., material used in sailing lines, sheets, etc.) The capture element 710 may have selected portions with this type of construction, or the entire capture element 710 may be composed of such materials. In still other embodiments, the capture element 710 may be composed of other suitable material(s).

Figure 8A:
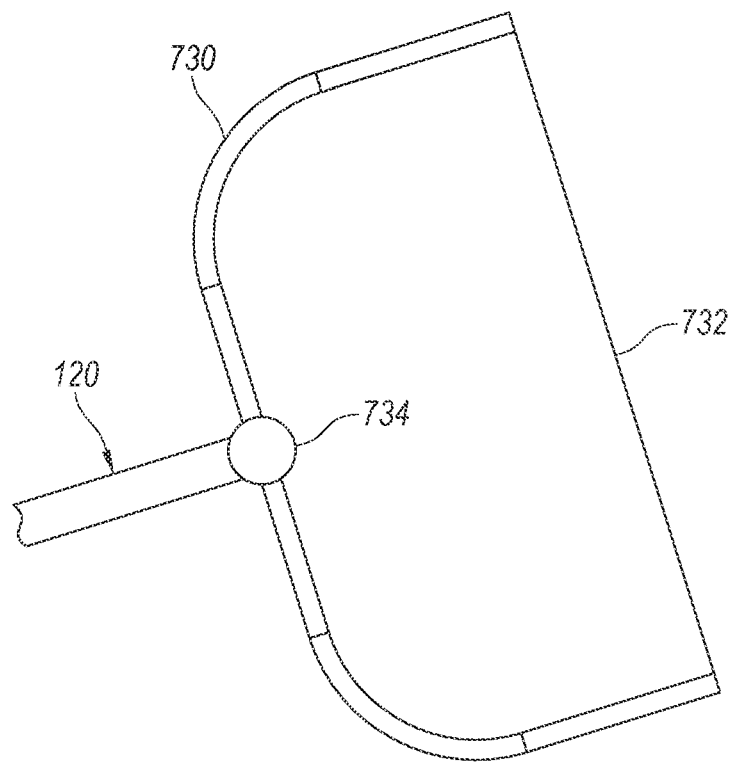
FIGS. 8A and 8B are partially schematic illustrations of a capture element carried by an aircraft capture member and configured in accordance with another embodiment of the present technology.
Figure 8B:
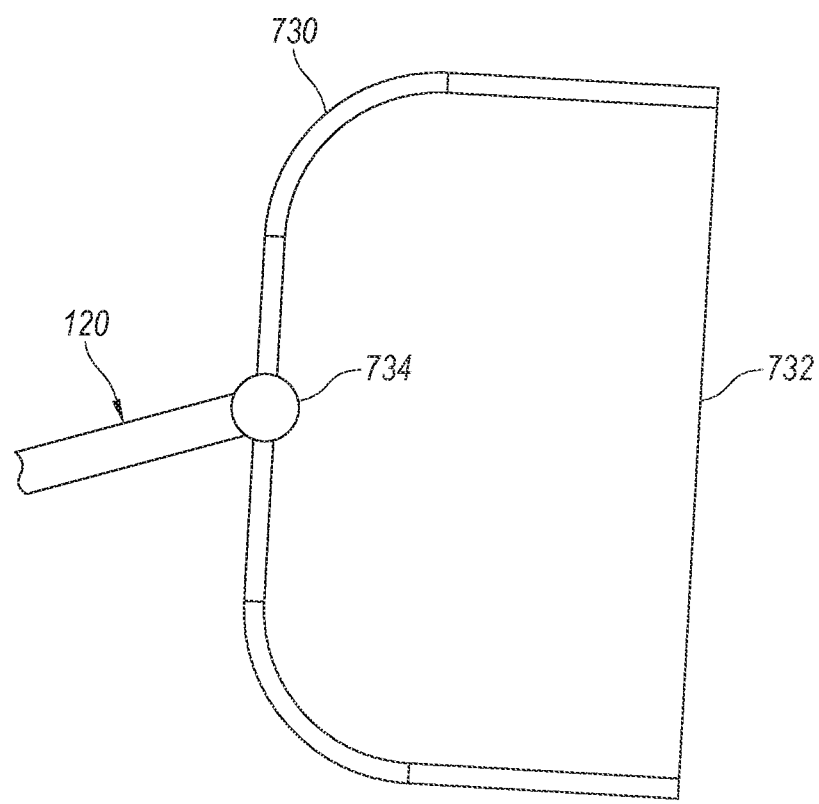

FIGS. 8A and 8B are partially schematic illustrations of a capture element 730 configured in accordance with another embodiment of the present technology. The capture element 730 is also shown extending from the distal end of aircraft capture member 120. As noted above, however, it will be appreciated that capture element 730 may be used with other aircraft capture members or other suitable components as part of an aircraft recovery system.

Referring to FIGS. 8A and 8B together, the capture element 730 includes several features generally similar to the capture element 710 described above and may be composed of similar or identical materials. For example, the capture element 730 also has a generally "C" shaped profile (a squared "C" shape), and a capture line 732 extending transversely between arms of the capture element 730. The capture element 730 differs from the capture element 710 described above in that capture element 730 is pivotably attached to the distal end of the aircraft capture member 120 via joint 734. As best seen in FIG. 8B, for example, the capture element 730 may be pivotably adjusted, via the joint 734, relative to the aircraft capture member 120 and/or the support surface carrying the system (not shown) to optimize the position of the capture element 730 relative to the incoming aircraft (not shown).

In some embodiments, the joint 734 may be configured to passively move the capture element 730 relative to the aircraft capture member 120 based on momentum from the aircraft or other external forces. In other embodiments, however, the joint 734 may be actively controlled via one or more powered actuators (not shown) to pivotably move the capture element 730 to desired orientation(s) relative to the aircraft capture member 120 and/or the support surface during operation.

Figure 9A:
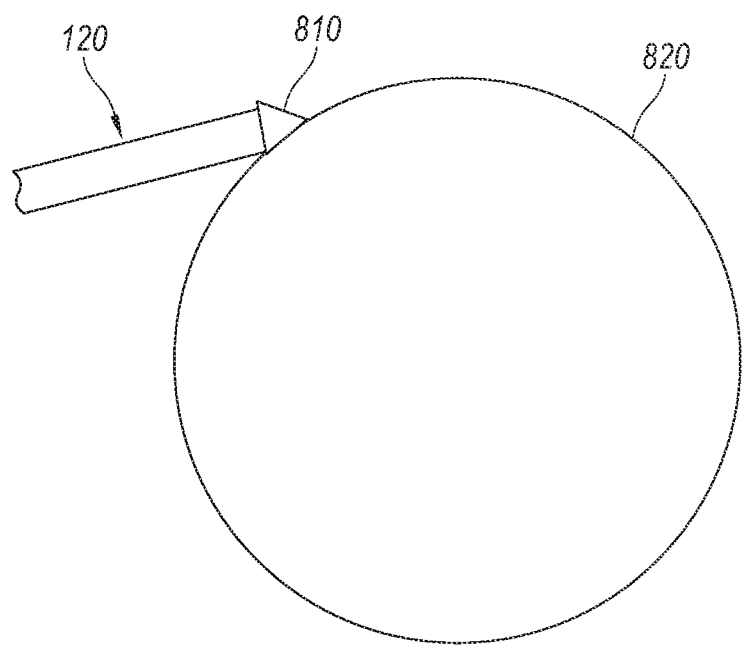
FIGS. 9A and 9B are partially schematic illustrations of a capture element carried by an aircraft capture member and configured in accordance with yet another embodiment of the present technology.
Figure 9B:
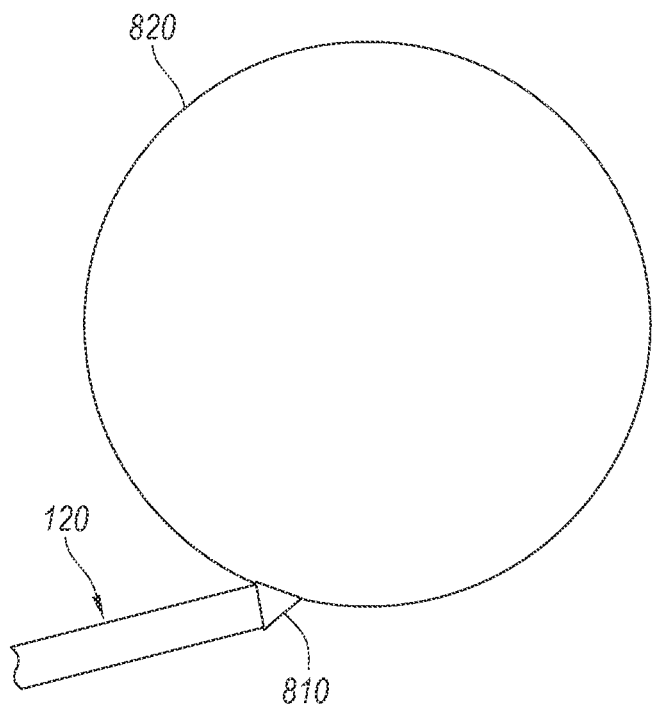

FIGS. 9A and 9B are partially schematic illustrations of a capture element 820 configured in accordance with still another embodiment of the present technology. In this embodiment, the capture element 820 has a generally closed circular or "hoop" shape. In other embodiments, however, the capture element 820 may have other suitable closed form shapes (e.g., ellipse, triangle, rhomboid, "D" shape, etc.). The capture element 820 may be composed of a variety of suitable materials having sufficient strength to support the aircraft during operation, while still allowing for some deformation/elasticity during capture.

In the embodiment shown in FIG. 9A, the capture element 820 is engaged with the aircraft capture member 120 via joint 810 and the capture element 820 is positioned below or generally below the distal end of the aircraft capture member 120 (and below a longitudinal axis of the aircraft capture member 120). During operation, the capture element 820 is positioned to engage a wing of the aircraft and slide along the wing until the capture element 820 securely contacts a corresponding engagement element at or near a tip of the wing. In the embodiment shown in FIG. 9B, however, the capture element 820 is coupled with the aircraft capture member 120 via joint 810 and is positioned above or generally above a distal end of the aircraft capture member 120.

One feature of the arrangements shown in FIGS. 9A and 9B is that the arrangement of capture element 820—either suspended downwardly from the aircraft capture member 120 or extending upwardly away from the aircraft capture member 120—is expected to accommodate minor lateral/vertical deviations of the aircraft along the approach flight path toward the aircraft capture member 120 and allow for a successful intercept of the aircraft in the event of such deviations, while minimizing the likelihood of the aircraft inadvertently striking other components of the system not intended to be in contact with the aircraft.

Figure 10:
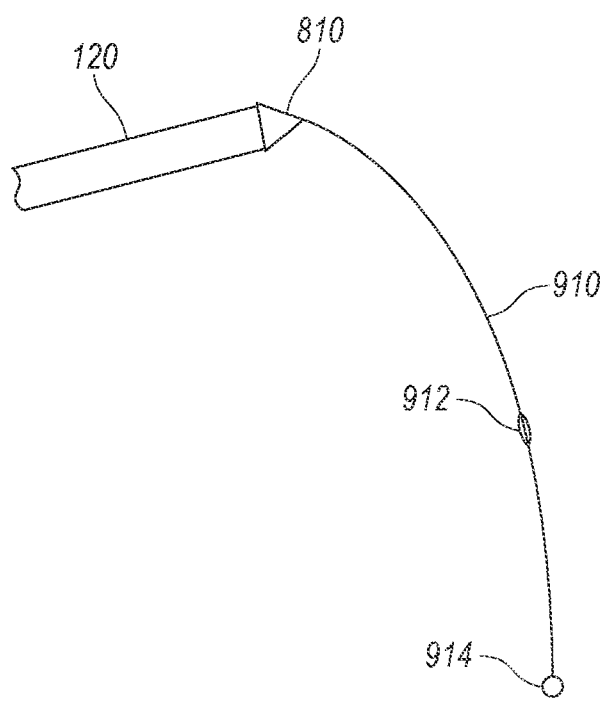
FIG. 10 is a partially schematic illustration of a capture element carried by an aircraft capture member and configured in accordance with still another embodiment of the present technology.

FIG. 10 is a partially schematic illustration of yet another embodiment of a capture element 910 extending from a distal end of aircraft capture member 120. The capture element 910 may have a number of features and material characteristics generally similar to the capture element 138 described above with reference to FIG. 3B. The capture element 910, however, differs from the capture element 138 described previously in that rather than having an initially linear or generally linear arrangement aligned with a longitudinal axis of the aircraft capture member 120, the capture element 910 is initially curved or non-linear and extends downward from joint 810 toward the support surface or ground (not shown) upon which the system is resting.

The capture element 910 may be rod or pole operably coupled the aircraft capture member 120 and configured to directly engage the aircraft (not shown) during capture operations. The capture element 910 may be composed of a variety of different materials such as carbon fiber, metal, plastic, or other suitable materials having the necessary strength and resilience to intercept, engage, and capture the aircraft during operation. In some embodiments, the capture element 910 can include an outer surface or sheath composed of a relatively soft, rope-like material or other suitable material configured to provide better grip for the engagement feature(s) carried by the aircraft.

The capture element 910 may have a variety of different shapes designed to enhance the likelihood of engagement and capture of the aircraft after intercept. In the illustrated embodiment, for example, the capture element 910 has a slightly arcuate or curved arrangement to facilitate sliding of the wing of the aircraft along the capture element 910 until the aircraft engagement features are securely engaged. In some embodiments, the capture element 910 may also include one or more line guiding features 912 (only one or shown) and one more stops 914 (only one is shown) to further assist with guiding the capture element 910 to the corresponding engagement features of the aircraft and help ensure secure engagement thereto. The line guiding feature(s) 912 and stop(s) 914 are optional features that may not be included in some embodiments. Further, it will be appreciated that the capture element 910 may have different shapes/arrangements than that shown in FIG. 10, such as a different curved shape, a compound curved shape, upward curvature (instead of downward curvature as shown), and other suitable shapes.

As noted previously, the capture elements described above with reference to FIGS. 7-10 are expected to improve reliability of the aircraft recovery system, even during operations in which there are unexpected deviations in the aircraft's approach/trajectory toward the aircraft capture member, variations due to atmospheric disturbances, navigational and control system response characteristics, and/or operator input. As further noted above, the capture elements are optional features that may not be included in some embodiments of aircraft capture systems configured in accordance with the present technology.

Figure 11A:
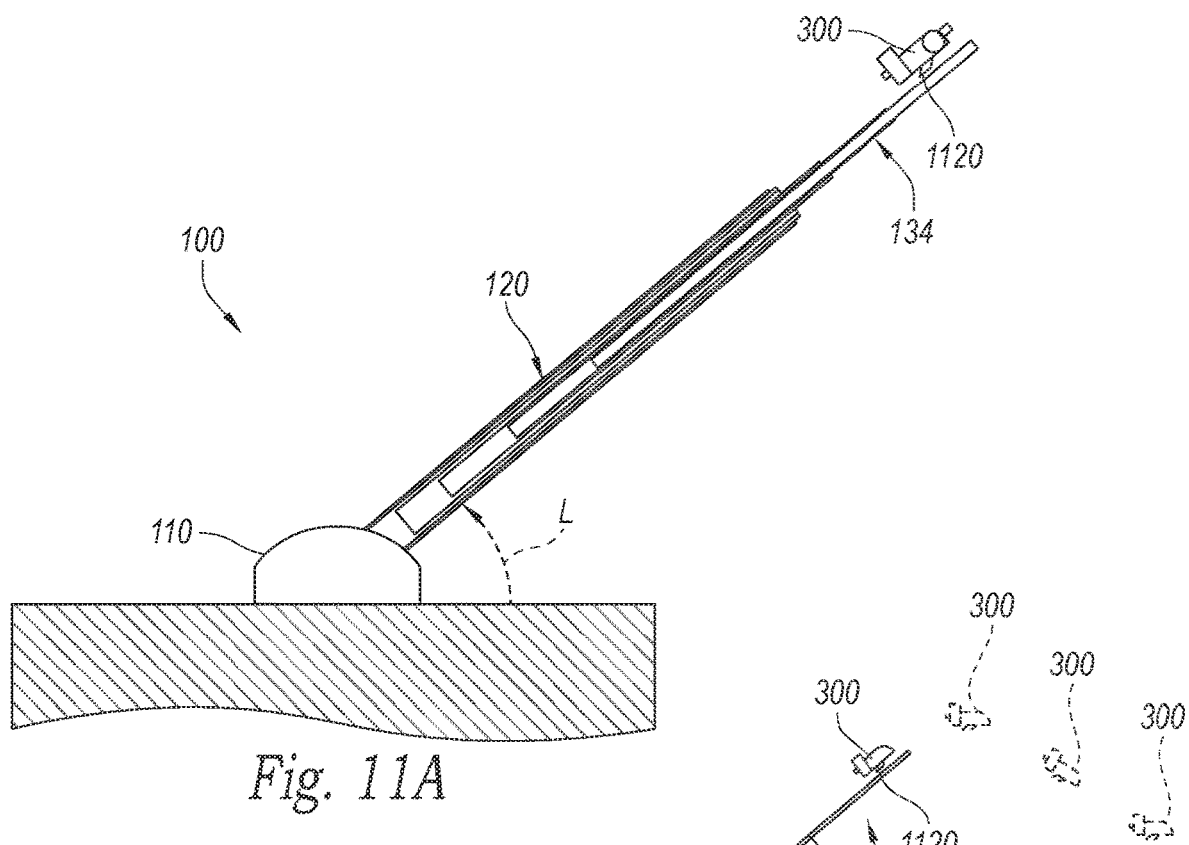
FIGS. 11A and 11B are partially schematic illustrations of the system of FIG. 1 configured to launch an unmanned aircraft in accordance with an embodiment of the technology.
Figure 11B:
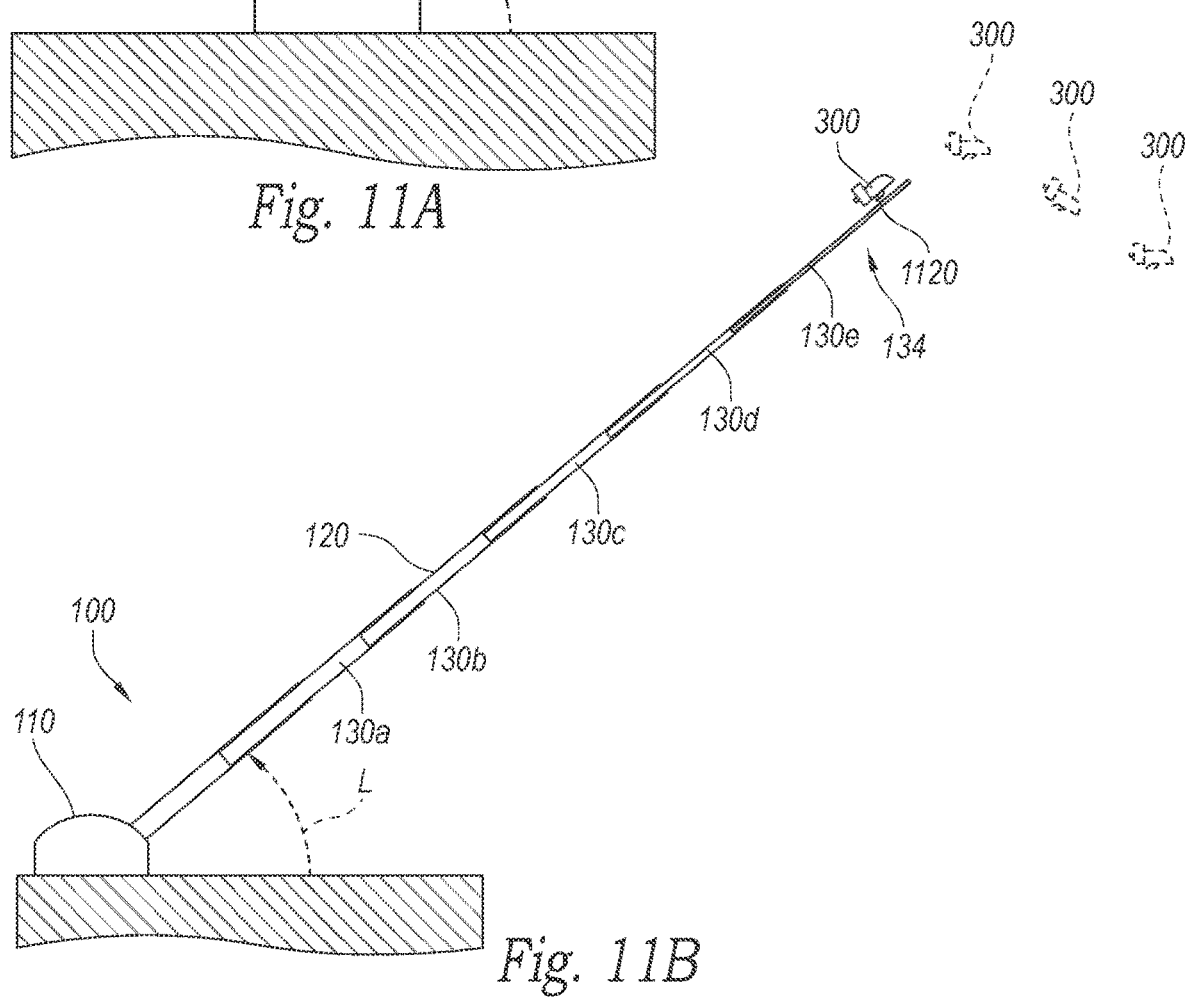

FIGS. 11A and 11B are partially schematic illustrations of the system 100 of FIG. 1 configured to launch an unmanned aircraft in accordance with an embodiment of the technology. More specifically, FIG. 11A shows the aircraft 300 positioned at or near the distal end 134 of aircraft capture member 120. In this first or initial state, the telescoping rod is in a compact arrangement and angled/canted at a desired launch angle L relative to the ground or local surface that base assembly 110 is resting upon. A variety of different launch angles L and orientations may be used based, at least, in part, upon the local environmental conditions, the size/configuration of the aircraft 300, the desired launch parameters, etc.

The aircraft 300 may be removably coupled to the member 120 via one or more launch carriages or launch assemblies 1120 (shown schematically). It will be appreciated that although only a single launch carriage is shown, in other embodiments the system may be used to launch the aircraft 300 with a different number of carriages and/or the aircraft 300 may be engaged with the system using other suitable mechanisms in lieu of launch carriage(s) 1120. The launch carriage 1120 may be configured to both releasably secure the aircraft 300 to the member 120, as well as protecting various components of the aircraft 300 from inadvertent contact with the member 120 or other portions of the system during launch. For example, the launch carriage 1120 may include one or more latches or other mechanical features to restrain for a desired period during the launch process before release.

FIG. 11B illustrates the aircraft 300 at a subsequent step of the launch process for aircraft 300. In the arrangement shown in FIG. 11B, the member 120 has elongated/payed out to its fullest extent such that each of segments 130a-e are extending as far as possible relative to each other along the longitudinal axis of member 120. The momentum for elongation of the member 120 may be used to accelerate the aircraft 300 toward its launch velocity. Additional launch forces may be necessary as well to provide the aircraft 300 with sufficient velocity when the member 120 is extended/payed out and the aircraft 300 is released from launch carriage 1120. Propulsive launch forces may be provided, for example, using a variety of suitable mechanisms for accelerating the launch carriage 1120 and/or the aircraft 300 directly. The propulsive forces may be provided via compressed air, compressed water, chemical rockets, springs (e.g., steel spring, rubber band, bungee, etc.), electromagnetic force, and/or other suitable techniques for accelerating the launch carriage 1120 and aircraft 300 for launch. During the launch process, the aircraft 300 can begin to exert balancing forces using its onboard control surfaces as soon as they begin to be effective, and continue to do so through release into free flight. This is expected to maximize the stability and reliability of the launch process and minimize the mass of the structure and system required to launch the aircraft 300.

In some embodiments, such as the one shown in FIG. 11B, even with the applied propulsive forces, the aircraft 300 may not achieve its full flight velocity at release from the member 120. Thus, once the aircraft 300 is under its own power, it may descend some variable distance from its original flight path (as shown in broken lines) while further accelerating to full flight velocity and regaining altitude to get on the planned flight path. It will be appreciated that the distal end 134 of member 120, when fully extended as shown in FIG. 11B, will be a sufficient elevation above the ground/support surface below to allow for this minor drop in elevation of the aircraft 300 as it is released from the launch carriage 1120 and begins flight under its own power.

ADDITIONAL EXAMPLES

Several aspects of the present technology are set forth in the following examples.

1. An aircraft system, comprising:
   a base assembly;
   an aircraft capture member attached to and extending from the base assembly, wherein the aircraft capture member has a distal region positioned to intercept an unmanned aircraft in flight,
   wherein the aircraft capture member comprises an elongated telescoping rod including a plurality of discrete segments having a telescoping arrangement relative to each other,
   wherein the aircraft capture member is configured to elongate or pay out from a first initial length to a second extended length greater than the first length after an unmanned aircraft intercepts and engages the distal region of the aircraft capture member.

2. The aircraft system of example 1 wherein the individual segments of the telescoping rod are aligned with each other and extend along a longitudinal axis of the rod.

3. The aircraft system of example 1 or example 2 wherein at least one segment of the telescoping rod comprises an engagement feature thereon and adapted to (a) allow movement of the telescoping rod a distal direction during elongation or pay out, and (b) restrict movement of the telescoping rod in a proximal direction after elongation.

4. The aircraft system of example 3 wherein the engagement feature comprises an annular ring arranged about an external surface of the at least one segment of the telescoping rod.

5. The aircraft system of example 1 or example 2 wherein at least one segment of the telescoping rod comprises a pneumatic resistance control system and adapted to (a) allow movement of the telescoping rod a distal direction during elongation or pay out, and (b) restrict movement of the telescoping rod in a proximal direction after elongation.

6. The aircraft system of example 5 wherein the pneumatic resistance control system comprises one or more openings in the telescoping rod and a one-way valve assembly installed at each opening.

7. The aircraft system of any one of examples 1-6, further comprising an energy absorber operably coupled to the aircraft capture member to absorb energy imparted to the aircraft capture member by an aircraft engaged with the distal region.

8. The aircraft system of example 7 wherein the energy absorber comprises a resilient line attached to the base assembly and extending within the aircraft capture member to an anchor point proximate the distal region of the aircraft capture member.

9. The aircraft system of any one of examples 1-8 wherein the distal region of the aircraft capture member is sized and adapted to intercept a wing of the unmanned aircraft in flight.

10. The aircraft system of any one of examples 1-9, further comprising a capture element operatively coupled to the distal region of the aircraft capture member, wherein the capture element is adapted to directly intercept a wing of the unmanned aircraft in flight.

11. The aircraft system of any one of examples 1-10 wherein:
   the aircraft capture member has an initial, first angled orientation relative to the base assembly before interception of the unmanned aircraft; and
   the aircraft capture member is configured to move through a generally vertical orientation to a second, angled orientation relative to the base assembly different than the first angled orientation after interception of the unmanned aircraft and during elongation or pay out of the aircraft capture member.

12. The aircraft system of any one of examples 1-11 wherein the elongated rod is composed of a carbon fiber material.

13. The aircraft system of any one of examples 1-11 wherein the elongated rod is composed of a carbon graphite material.

14. The aircraft system of any one of examples 1-11 wherein the elongated rod is composed of a graphite/boron composite material.

15. The aircraft system of any one of examples 1-14, further comprising a tension line attached to the aircraft capture member, and wherein the system further comprises a tension reel operatively coupled to the tension line and configured to wind and/or unwind the tension line during operation after the aircraft intercepts the aircraft capture member and during elongation of the aircraft capture member.

16. The aircraft system of any one of examples 1-15 wherein the individual segments of the telescoping rod are at least initially generally curved, and wherein the curved segments are arranged relative to each other in the telescoping arrangement.

17. The aircraft system of any one of examples 1-16, further comprising the unmanned aircraft.

18. A method for capturing and recovering an unmanned aircraft in flight, the method comprising:
   flying an unmanned aircraft to intercept a distal region of an elongated telescoping rod, wherein the telescoping rod is attached to and extending from a base assembly in contact with a local support surface, and wherein the telescoping rod includes a plurality of discrete segments having a telescoping arrangement relative to each other; and
   releasably capturing the aircraft with the telescoping rod, wherein, in response to momentum from the aircraft, the telescoping rod is configured to pay out or extend from a first length to a second length greater than the first length.

19. The method of example 18, further comprising suspending the aircraft from the telescoping rod and out of contact the local support surface or ground after releasably capturing the aircraft.

20. The method of example 19, further comprising transforming the telescoping rode from the extended second length after releasably capturing the aircraft back to a third length less than the second length for retrieval of the aircraft, wherein the first length and third length are approximately equal.

21. The method of any one of examples 18-20 wherein the telescoping rod has an initial, first angled orientation relative to the base assembly, and wherein releasably capturing the aircraft with the telescoping rod comprises pivotably moving the telescoping rod from the first angled orientation through a generally vertical position and to a second, angled orientation relative to the base assembly different than the first angled orientation as the telescoping rod is payed out or extended during capture operations.

22. The method of any one of examples 18-21, further comprising an anchor line operatively coupled to the base assembly and extending to an anchor point within the telescoping rod and proximate to the distal region, and wherein releasably capturing the aircraft with the telescoping rod further comprises transferring at least a portion of the momentum from the aircraft to the anchor line.

CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although many of the systems described herein describe rotational movement of the aircraft capture members/base assemblies during capture and recovery operations to absorb and transfer momentum energy from the aircraft being captured, it will be appreciated that in some embodiments the aircraft capture member may be fixed to the base assembly in a non-rotational arrangement. In such embodiments, capture and deceleration of the aircraft may be accomplished via passive and active components of the telescoping rod, the anchor line(s), and associated structure(s) of the disclosed technology. Furthermore, although the aircraft capture members described above have a generally upwardly angled/canted arrangement, the aircraft capture members may also be suspended from a suitable support structure in a generally downward orientation for capture and recovery operations. Moreover, in particular embodiments described herein, energy absorbers can include bungee lines or other flexible and stretchable elements. In other embodiments, suitable energy absorbers can include a line wound on a wheel that includes a resistive element to absorb energy, and/or a ratchet mechanism to prevent the line from rewinding or otherwise recoiling until the device is to be reset. Further, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A system, comprising:
a base assembly; and
an aircraft capture member attached to and extending from the base assembly, wherein the aircraft capture member has a distal region positioned to intercept an unmanned aircraft in flight,
wherein the aircraft capture member comprises an elongated telescoping rod including a plurality of discrete segments having a telescoping arrangement relative to each other,
wherein at least one segment of the telescoping rod comprises an engagement feature thereon and adapted to (a) allow movement of the telescoping rod along a distal direction during elongation or pay out, and (b) restrict movement of the telescoping rod in a proximal direction after elongation, and
wherein the aircraft capture member is configured to elongate or pay out from a first initial length to a second extended length greater than the first length after an unmanned aircraft intercepts and engages the distal region of the aircraft capture member.

2. The system of claim 1, wherein the segments of the telescoping rod are aligned with each other and extend along a longitudinal axis of the rod.

3. The system of claim 1, wherein the engagement feature comprises an annular ring arranged about an external surface of the at least one segment of the telescoping rod.

4. The system of claim 1, further comprising an energy absorber operably coupled to the aircraft capture member to absorb energy imparted to the aircraft capture member by an aircraft engaged with the distal region.

5. The system of claim 4, wherein the energy absorber comprises a resilient line attached to the base assembly and extending within the aircraft capture member to an anchor point proximate the distal region of the aircraft capture member.

6. The system of claim 1, wherein the distal region of the aircraft capture member is sized and adapted to intercept a wing of the unmanned aircraft in flight.

7. The system of claim 1, further comprising a capture element operatively coupled to the distal region of the aircraft capture member, wherein the capture element is adapted to directly intercept a wing of the unmanned aircraft in flight.

8. The system of claim 1, wherein:
the aircraft capture member has an initial, first angled orientation relative to the base assembly before interception of the unmanned aircraft; and
the aircraft capture member is configured to move through a generally vertical orientation to a second, angled orientation relative to the base assembly different than the first angled orientation after interception of the unmanned aircraft and during elongation or pay out of the aircraft capture member.

9. The system of claim 1, wherein the elongated rod is at least partially composed of at least one of a carbon fiber material, a carbon graphite material or a graphite/boron composite material.

10. The system of claim 1, further comprising a tension line attached to the aircraft capture member, and wherein the system further comprises a tension reel operatively coupled to the tension line and configured to wind and/or unwind the tension line during operation after the aircraft intercepts the aircraft capture member and during elongation of the aircraft capture member.

11. The system of claim 1, wherein the telescoping rod is to retract to a third length smaller than the second extended length in response to the telescoping rod elongating to the second extended length.

12. The system of claim 11, wherein the third length corresponds to a retrieval height.

13. A system, comprising:
a base assembly; and
an aircraft capture member attached to and extending from the base assembly, wherein the aircraft capture member has a distal region positioned to intercept an unmanned aircraft in flight,
wherein the aircraft capture member comprises an elongated telescoping rod including a plurality of discrete segments having a telescoping arrangement relative to each other,
wherein the aircraft capture member is configured to elongate or pay out from a first initial length to a second extended length greater than the first length after an unmanned aircraft intercepts and engages the distal region of the aircraft capture member, and
wherein at least one segment of the telescoping rod comprises a pneumatic resistance control system and adapted to (a) allow movement of the telescoping rod along a distal direction during elongation or pay out, and (b) restrict movement of the telescoping rod in a proximal direction after elongation.

14. The system of claim 13, wherein the pneumatic resistance control system comprises one or more openings in the telescoping rod and a one-way valve assembly installed at each opening.

15. A system, comprising:
a base assembly;
an aircraft capture member attached to and extending from the base assembly, wherein the aircraft capture member has a distal region positioned to intercept an unmanned aircraft in flight,
wherein the aircraft capture member comprises an elongated telescoping rod including a plurality of discrete segments having a telescoping arrangement relative to each other, and
wherein the aircraft capture member is configured to elongate or pay out from a first initial length to a second extended length greater than the first length after an unmanned aircraft intercepts and engages the distal region of the aircraft capture member, and
wherein the segments of the telescoping rod are at least initially generally curved to define curved segments, and wherein the curved segments are arranged relative to each other in the telescoping arrangement.

16. A method comprising:
flying an unmanned aircraft to intercept a distal region of an elongated telescoping rod, wherein the telescoping rod is attached to and extending from a base assembly in contact with a local support surface, wherein the telescoping rod includes a plurality of discrete segments having a telescoping arrangement relative to each other, and wherein at least one segment of the telescoping rod comprises an engagement feature thereon and adapted to (a) allow movement of the telescoping rod along a distal direction during elongation or pay out, and (b) restrict movement of the telescoping rod in a proximal direction after elongation; and
releasably capturing the aircraft with the telescoping rod, wherein, in response to momentum from the aircraft, the telescoping rod is configured to pay out or extend from a first length to a second length greater than the first length.

17. The method of claim 16, further comprising suspending the aircraft from the telescoping rod and out of contact the local support surface or ground after releasably capturing the aircraft.

18. The method of claim 17, further comprising transforming the telescoping rode from the extended second length after releasably capturing the aircraft back to a third length less than the second length for retrieval of the aircraft, wherein the first length and third length are approximately equal.

19. The method of claim 16, wherein the telescoping rod has an initial, first angled orientation relative to the base assembly, and wherein releasably capturing the aircraft with the telescoping rod comprises pivotably moving the telescoping rod from the first angled orientation through a generally vertical position and to a second, angled orientation relative to the base assembly different than the first angled orientation as the telescoping rod is payed out or extended during capture operations.

20. The method of claim 16, wherein an anchor line operatively coupled to the base assembly and extending to an anchor point within the telescoping rod and proximate to the distal region, and wherein releasably capturing the aircraft with the telescoping rod further comprises transferring at least a portion of the momentum from the aircraft to the anchor line.

21. A system, comprising:
a base assembly;
an aircraft capture member attached to and extending from the base assembly, wherein the aircraft capture member has a distal region positioned to intercept an unmanned aircraft in flight,
wherein the aircraft capture member comprises an elongated telescoping rod, wherein at least one segment of the telescoping rod comprises an engagement feature thereon and adapted to (a) allow movement of the telescoping rod along a distal direction during elongation or pay out, and (b) restrict movement of the telescoping rod in a proximal direction after elongation, and
wherein the aircraft capture member includes an energy absorber to absorb energy imparted to the aircraft capture member by an aircraft engaged with the distal region.

* * * * *